(12) United States Patent
Nagano

(10) Patent No.: US 10,330,899 B2
(45) Date of Patent: Jun. 25, 2019

(54) IMAGE-FORMING LENS AND IMAGING DEVICE

(71) Applicant: Takuya Nagano, Kanagawa (JP)

(72) Inventor: Takuya Nagano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/915,100

(22) Filed: Mar. 8, 2018

(65) Prior Publication Data

US 2018/0267277 A1 Sep. 20, 2018

(30) Foreign Application Priority Data

Mar. 16, 2017 (JP) ................................. 2017-051481

(51) Int. Cl.
    G02B 15/14 (2006.01)
    G02B 15/15 (2006.01)
    G02B 1/00 (2006.01)
    G02B 9/64 (2006.01)

(52) U.S. Cl.
    CPC ............. G02B 15/15 (2013.01); G02B 1/00 (2013.01); G02B 9/64 (2013.01)

(58) Field of Classification Search
    CPC ............. G02B 15/15; G02B 1/00; G02B 9/64
    USPC .......................... 359/689, 691, 717, 784, 793
    See application file for complete search history.

(56) References Cited

U.S. PATENT DOCUMENTS

| 2002/0005851 | A1* | 1/2002 | Kinno ............... G02B 13/02 345/426 |
| 2016/0077308 | A1 | 3/2016 | Sudoh |
| 2016/0077310 | A1 | 3/2016 | Sudoh |

FOREIGN PATENT DOCUMENTS

| JP | 2013-218015 | 10/2013 |
| JP | 2016-061902 | 4/2016 |
| JP | 2016-061918 | 4/2016 |
| JP | 2016-061926 | 4/2016 |

\* cited by examiner

*Primary Examiner* — William Choi
(74) *Attorney, Agent, or Firm* — Oblon, McClelland, Maier & Neustadt, L.L.P.

(57) ABSTRACT

An image-forming lens includes a stop, a first lens group and a second lens group. The first lens group includes a first lens, a second lens, a third lens, a fourth lens, and a fifth lens arranged in that order from the object side. The second lens group includes a negative subgroup and a positive subgroup arranged in that order from the object side. The first lens group is movable to the object side to increase a distance between the stop and the first lens group in a change in focusing from an object at infinity to an object close to the image-forming lens. Conditional expression (1) below being satisfied:

$0.45 < f_{1G}/f < 0.75$ where
f1G is a focal length of the first lens group, and
f is a focal length of an entire system of the image-forming lens focused on the object at infinity.

13 Claims, 26 Drawing Sheets

FIG. 28
TABLE 1

| | R | D | $N_d$ | $\nu_d$ | $\theta_{gF}$ | NOTES |
|---|---|---|---|---|---|---|
| 1 | 43.120 | 2.03 | 1.61800 | 63.33 | 0.5441 | FIRST LENS |
| 2 | -711.139 | 0.10 | | | | |
| 3 | 24.651 | 3.71 | 1.43875 | 94.66 | 0.5340 | SECOND LENS |
| 4 | -66.363 | 1.00 | 1.83481 | 42.72 | 0.5648 | THIRD LENS |
| 5 | 161.688 | 9.43 | | | | |
| 6 | 21.723 | 0.87 | 1.72151 | 29.23 | 0.6053 | FOURTH LENS |
| 7 | 14.278 | 0.46 | | | | |
| 8 | 17.791 | 3.01 | 1.59282 | 68.62 | 0.5441 | FIFTH LENS |
| 9 | -189.867 | VARIABLE (A) | | | | |
| 10 | 0.000 | 1.00 | | | | STOP |
| 11 | 128.142 | 1.29 | 1.48749 | 70.24 | 0.5300 | SIXTH LENS |
| 12 | 8.922 | 0.92 | | | | |
| 13 | -49.278 | 0.70 | 1.48749 | 70.24 | 0.5300 | SEVENTH LENS |
| 14 | 21.633 | 6.89 | | | | |
| 15 | 20.149 | 2.68 | 1.61800 | 63.33 | 0.5441 | EIGHTH LENS |
| 16 | -34.942 | 12.48 | | | | |
| 17 | ∞ | 0.75 | 1.51633 | 64.14 | | COVER GLASS |
| 18 | ∞ | BF | | | | |

FIG. 29
TABLE 2

| WD | INFINITY | 0.25 m | 0.10 m |
|---|---|---|---|
| A | 4.000 | 7.464 | 13.992 |

FIG. 30
TABLE 3

| | |
|---|---|
| $f_{1G}/f$ | 0.56 |
| $d_{L3-L4}/D_{1G}$ | 0.46 |
| $n_d$ | 1.44 |
| $\nu_d$ | 94.66 |
| $\theta_{g,F} - (-0.001742 \times \nu_d + 0.6490)$ | 0.050 |
| $f_{L3}/f_{L4}$ | 0.93 |
| $(R_{L5sur.1} - R_{L4sur.2})/(R_{L5sur.1} + R_{L4sur.2})$ | 0.11 |
| $(R_{L7sur.1} - R_{L6sur.2})/(R_{L7sur.1} + R_{L6sur.2})$ | 0.69 |
| $d_{L7-L8}/L_{2G}$ | 0.26 |

FIG. 31
TABLE 4

| | R | D | $N_d$ | $\nu_d$ | $\theta_{gF}$ | NOTES |
|---|---|---|---|---|---|---|
| 1 | 44.840 | 1.90 | 1.61800 | 63.33 | 0.5441 | FIRST LENS |
| 2 | -8055.270 | 0.10 | | | | |
| 3 | 25.153 | 3.72 | 1.49700 | 81.54 | 0.5375 | SECOND LENS |
| 4 | -63.502 | 1.01 | 1.83481 | 42.72 | 0.5648 | THIRD LENS |
| 5 | 140.672 | 9.26 | | | | |
| 6 | 20.402 | 0.87 | 1.72151 | 29.23 | 0.6053 | FOURTH LENS |
| 7 | 13.625 | 0.45 | | | | |
| 8 | 16.591 | 3.21 | 1.53775 | 74.70 | 0.5392 | FIFTH LENS |
| 9 | -149.909 | VARIABLE (A) | | | | |
| 10 | 0.000 | 2.00 | | | | STOP |
| 11 | 131.460 | 1.17 | 1.48749 | 70.24 | 0.5300 | SIXTH LENS |
| 12 | 8.527 | 0.97 | | | | |
| 13 | -38.094 | 0.70 | 1.48749 | 70.24 | 0.5300 | SEVENTH LENS |
| 14 | 25.893 | 6.94 | | | | |
| 15 | 20.826 | 2.80 | 1.61800 | 63.33 | 0.5441 | EIGHTH LENS |
| 16 | -30.705 | 12.51 | | | | |
| 17 | ∞ | 0.75 | 1.51633 | 64.14 | | COVER GLASS |
| 18 | ∞ | BF | | | | |

FIG. 32
TABLE 5

| WD | INFINITY | 0.25 m | 0.10 m |
|---|---|---|---|
| A | 3.000 | 6.444 | 12.985 |

FIG. 33
TABLE 6

| | |
|---|---|
| $f_{1G}/f$ | 0.56 |
| $d_{L3-L4}/D_{1G}$ | 0.45 |
| $n_d$ | 1.50 |
| $\nu_d$ | 81.54 |
| $\theta_{g,F} - (-0.001742 \times \nu_d + 0.6490)$ | 0.031 |
| $f_{L3}/f_{L4}$ | 0.87 |
| $(R_{L5sur.1} - R_{L4sur.2})/(R_{L5sur.1} + R_{L4sur.2})$ | 0.10 |
| $(R_{L7sur.1} - R_{L6sur.2})/(R_{L7sur.1} + R_{L6sur.2})$ | 0.63 |
| $d_{L7-L8}/L_{2G}$ | 0.26 |

FIG. 34
TABLE 7

| | R | D | $N_d$ | $\nu_d$ | $\theta_{g,F}$ | NOTES |
|---|---|---|---|---|---|---|
| 1 | 49.732 | 1.81 | 1.61800 | 63.33 | 0.5441 | FIRST LENS |
| 2 | -825.382 | 1.57 | | | | |
| 3 | 19.691 | 3.35 | 1.49700 | 81.54 | 0.5375 | SECOND LENS |
| 4 | -91.084 | 0.70 | 1.61340 | 44.27 | 0.5633 | THIRD LENS |
| 5 | 62.782 | 6.97 | | | | |
| 6 | 17.278 | 0.70 | 1.78470 | 26.29 | 0.6135 | FOURTH LENS |
| 7 | 12.203 | 0.69 | | | | |
| 8 | 17.189 | 2.01 | 1.59522 | 67.73 | 0.5442 | FIFTH LENS |
| 9 | 79.966 | VARIABLE (A) | | | | |
| 10 | 0.000 | 1.50 | | | | STOP |
| 11 | 321.278 | 3.52 | 1.51633 | 64.14 | 0.5353 | SIXTH LENS |
| 12 | 13.294 | 0.69 | | | | |
| 13 | -143.356 | 4.00 | 1.48749 | 70.24 | 0.5300 | SEVENTH LENS |
| 14 | 13.260 | 7.22 | | | | |
| 15 | 21.721 | 2.47 | 1.65160 | 58.55 | 0.5425 | EIGHTH LENS |
| 16 | -33.951 | 12.50 | | | | |
| 17 | ∞ | 0.50 | 1.51633 | 64.14 | | COVER GLASS |
| 18 | ∞ | BF | | | | |

FIG. 35
TABLE 8

| WD | INFINITY | 0.25 m | 0.10 m |
|---|---|---|---|
| A | 1.500 | 5.248 | 12.819 |

FIG. 36
TABLE 9

| $f_{1G}/f$ | 0.58 |
|---|---|
| $d_{L3-L4}/D_{1G}$ | 0.39 |
| $n_d$ | 1.50 |
| $\nu_d$ | 81.54 |
| $\theta_{g,F} - (-0.001742 \times \nu_d + 0.6490)$ | 0.031 |
| $f_{L3}/f_{L4}$ | 1.07 |
| $(R_{L5sur.1} - R_{L4sur.2})/(R_{L5sur.1} + R_{L4sur.2})$ | 0.17 |
| $(R_{L7sur.1} - R_{L6sur.2})/(R_{L7sur.1} + R_{L6sur.2})$ | 0.83 |
| $d_{L7-L8}/L_{2G}$ | 0.23 |

FIG. 37
TABLE 10

| | R | D | $N_d$ | $\nu_d$ | $\theta_{g,F}$ | NOTES |
|---|---|---|---|---|---|---|
| 1 | 53.570 | 1.66 | 1.85026 | 32.27 | 0.5929 | FIRST LENS |
| 2 | 752.141 | 2.57 | | | | |
| 3 | 25.892 | 3.73 | 1.43875 | 94.66 | 0.5340 | SECOND LENS |
| 4 | -53.836 | 1.00 | 1.90366 | 31.31 | 0.5947 | THIRD LENS |
| 5 | 254.178 | 8.16 | | | | |
| 6 | 24.541 | 0.90 | 1.76182 | 26.52 | 0.6136 | FOURTH LENS |
| 7 | 15.812 | 0.43 | | | | |
| 8 | 19.406 | 3.27 | 1.61800 | 63.33 | 0.5441 | FIFTH LENS |
| 9 | -85.590 | VARIABLE (A) | | | | |
| 10 | 0.000 | 1.00 | | | | STOP |
| 11 | 223.951 | 1.00 | 1.57501 | 41.50 | 0.5767 | SIXTH LENS |
| 12 | 9.525 | 0.91 | | | | |
| 13 | -37.625 | 2.56 | 1.48749 | 70.24 | 0.5300 | SEVENTH LENS |
| 14 | 29.593 | 5.59 | | | | |
| 15 | 23.869 | 4.00 | 1.78590 | 44.20 | 0.5631 | EIGHTH LENS |
| 16 | -38.431 | 12.46 | | | | |
| 17 | ∞ | 0.75 | 1.51633 | 64.14 | | COVER GLASS |
| 18 | ∞ | BF | | | | |

FIG. 38
TABLE 11

| WD | INFINITY | 0.25 m | 0.10 m |
|---|---|---|---|
| A | 5.200 | 8.716 | 15.207 |

FIG. 39
TABLE 12

| | |
|---|---|
| $f_{1G}/f$ | 0.57 |
| $d_{L3-L4}/D_{1G}$ | 0.38 |
| $n_d$ | 1.44 |
| $\nu_d$ | 94.66 |
| $\theta_{g,F} - (-0.001742 \times \nu_d + 0.6490)$ | 0.050 |
| $f_{L3}/f_{L4}$ | 0.80 |
| $(R_{L5sur.1} - R_{L4sur.2})/(R_{L5sur.1} + R_{L4sur.2})$ | 0.10 |
| $(R_{L7sur.1} - R_{L6sur.2})/(R_{L7sur.1} + R_{L6sur.2})$ | 0.60 |
| $d_{L7-L8}/L_{2G}$ | 0.20 |

IMAGE-FORMING LENS AND IMAGING DEVICE

CROSS-REFERENCE TO RELATED APPLICATIONS

This patent application is based on and claims priority pursuant to 35 U.S.C. § 119(a) to Japanese Patent Application No. 2017-051481, filed on Mar. 16, 2017 in the Japan Patent Office, the entire disclosure of which is hereby incorporated by reference herein.

BACKGROUND

Technical Field

Embodiments of the present disclosure relate to an image-forming lens and an imaging device.

Background Art

Imaging devices each including an area sensor have been widely used as cameras for capturing an image of an object.

Further, industrial cameras such as imaging devices for so-called machine vision are also expanding as image input apparatuses such as inspection apparatuses.

Such industrial cameras are needed to capture images with constant accuracy according to objects at various distances, and are known to have a lens configuration that reduces a deterioration in lens performance due to focusing.

SUMMARY

In one aspect of this disclosure, there is provided an improved image-forming lens including a stop, a first lens group and a second lens group. The first lens group is disposed on an object side of the stop. The second lens group is disposed on an image side of the stop. The first lens group includes a first lens having positive refractive power, a second lens having positive refractive power, a third lens having negative refractive power, a fourth lens having negative refractive power, and a fifth lens having positive refractive power, which are sequentially arranged in that order from the object side. The second lens group includes a negative subgroup having negative refractive power and a positive subgroup having positive refractive power, which are sequentially arranged in that order from the object side. The first lens group is movable to the object side to increase a distance between the stop and the first lens group in a change in focusing from an object at infinity to an object close to the image-forming lens. Conditional expression (1) below being satisfied:

$$0.45 < f_{1G}/f < 0.75$$

where f1G is a focal length of the first lens group, and f is a focal length of an entire system of the image-forming lens focused on the object at infinity.

In another aspect of this disclosure there is provided an improved imaging device comprising the above-described image-forming lens.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIG. 28 is an illustration of Table 1 representing data regarding the image-forming lens according to Example 1;

FIG. 29 is an illustration of Table 2 representing data regarding the variable distance in the image forming lens according to Example 1;

FIG. 30 is an illustration of Table 3 representing values of conditional expressions (1) through (9) according to Example 1;

FIG. 31 is an illustration of Table 4 representing data regarding the image-forming lens according to Example 2;

FIG. 32 is an illustration of Table 5 representing data regarding the variable distance in the image forming lens according to Example 2;

FIG. 33 is an illustration of Table 6 representing values of conditional expressions (1) through (9) according to Example 2;

FIG. 34 is an illustration of Table 7 representing data regarding the image-forming lens according to Example 3;

FIG. 35 is an illustration of Table 8 representing data regarding the variable distance in the image forming lens according to Example 3;

FIG. 36 is an illustration of Table 9 representing values of conditional expressions (1) through (9) according to Example 3;

FIG. 37 is an illustration of Table 10 representing data regarding the image-forming lens according to Example 4;

FIG. 38 is an illustration of Table 11 representing data regarding the variable distance in the image forming lens according to Example 4; and FIG. 39 is an illustration of Table 12 representing values of conditional expressions (1) through (9) according to Example 4.

DETAILED DESCRIPTION

Figure 1:
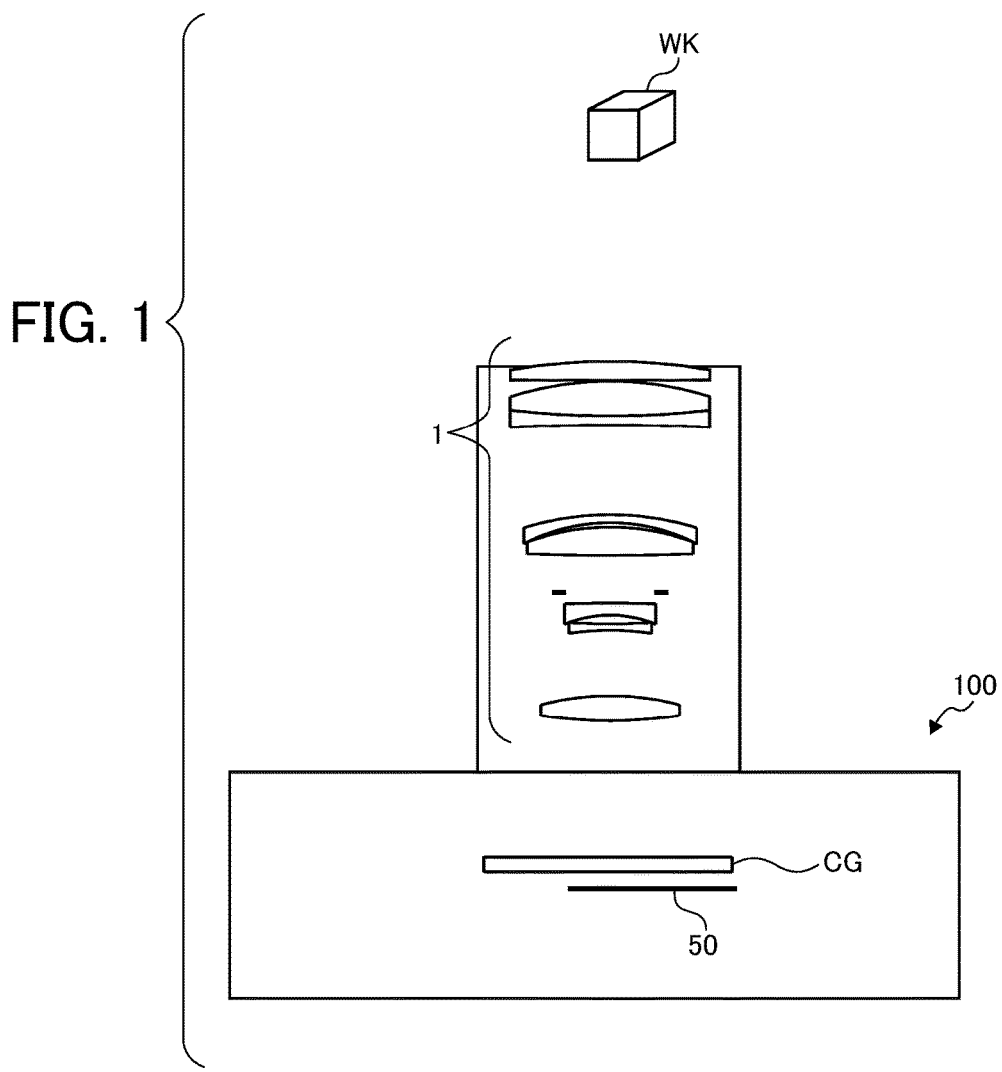
FIG. 1 is an illustration of an example of an imaging device according to an embodiment of the present disclosure.

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

The present disclosure is not limited to the following embodiments, and the constituent elements of the embodiments includes those which can be easily conceived by those skilled in the art, substantially the same ones, and those in the following embodiments include those which can be easily conceived by those skilled in the art, substantially the same, and within equivalent ranges. Furthermore, various omissions, substitutions, changes and combinations of constituent elements can be made without departing from the gist of the following embodiments.

FIG. 1 is an illustration of an imaging device 100 that includes an image-forming lens 1 according to an embodiment of the present disclosure.

The imaging device 100 includes the image-forming lens 1 that includes lens groups having a two-group configuration, and an image sensor 50 that enables recognizing light having passed through the image-forming lens 1 as an image.

FIGS. 2 through 13 are illustrations of specific lens configurations according to embodiments of the present disclosure. In FIGS. 2 through 13, the left side of the figure is the object side, and the right side of the figure is the image side. The same reference signs are given to corresponding elements in FIGS. 2 through 13 to facilitate understanding of the elements.

FIGS. 2, 5, 8, and 11 are illustrations of the configurations of the image-forming lens 1 focused at infinity. FIGS. 3, 6, 9, and 12 are illustrations of the image-forming lens 1 focused at the working distance of 0.25 m. FIGS. 4, 7, 10, and 13 are illustrations of the image-forming lens 1 focused at the working distance of 0.10 m. Note that the "working distance" refers to an operating distance of the imaging device 100, between a work WK as a target (an object) to be imaged and the leading end of the image-forming lens 1.

Figure 2:
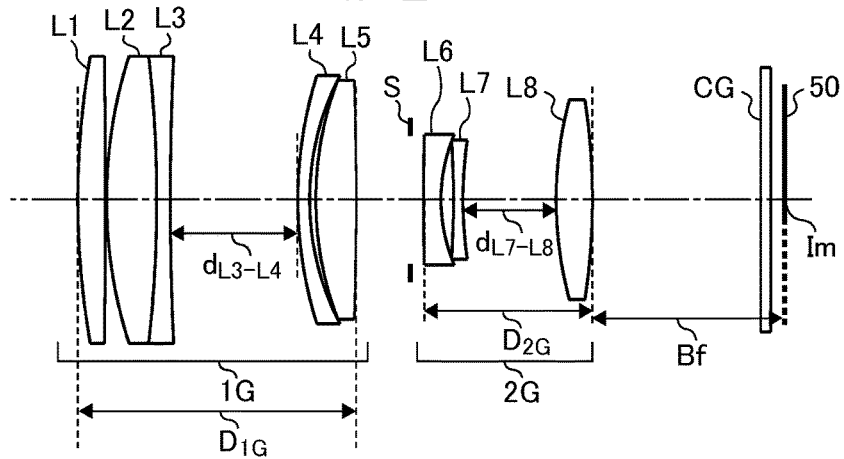
FIG. 2 is an illustration of an image-forming lens according to Example 1.
Figure 3:
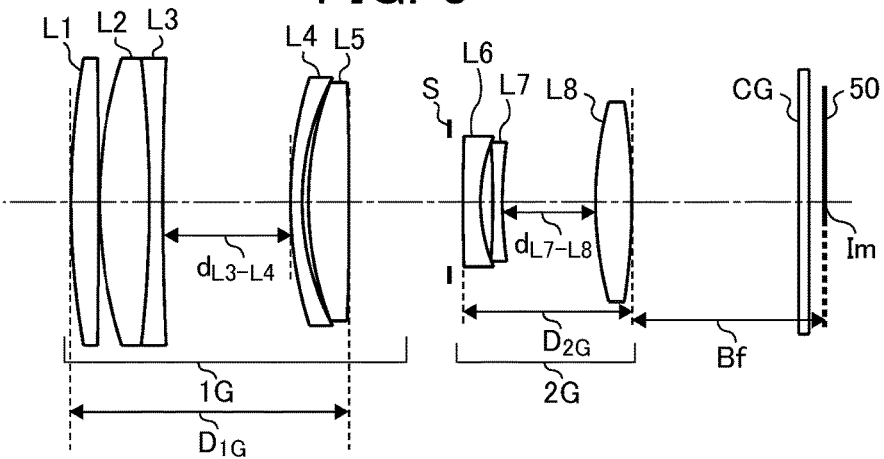
FIG. 3 is an illustration of the image-forming lens according to Example 1 focused at a working distance of 0.25 meters (m)
Figure 4:
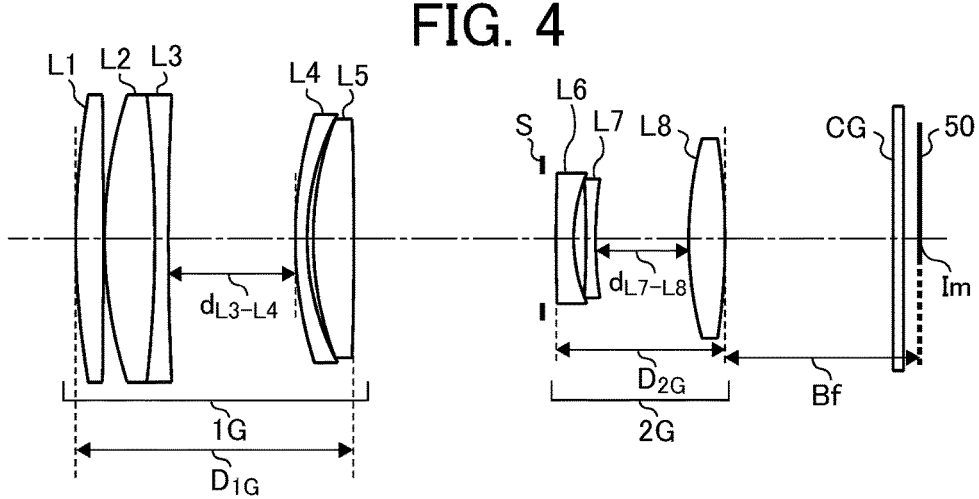
FIG. 4 is an illustration of the image-forming lens according to Example 1 focused at a working distance of 0.10 m.
Figure 5:
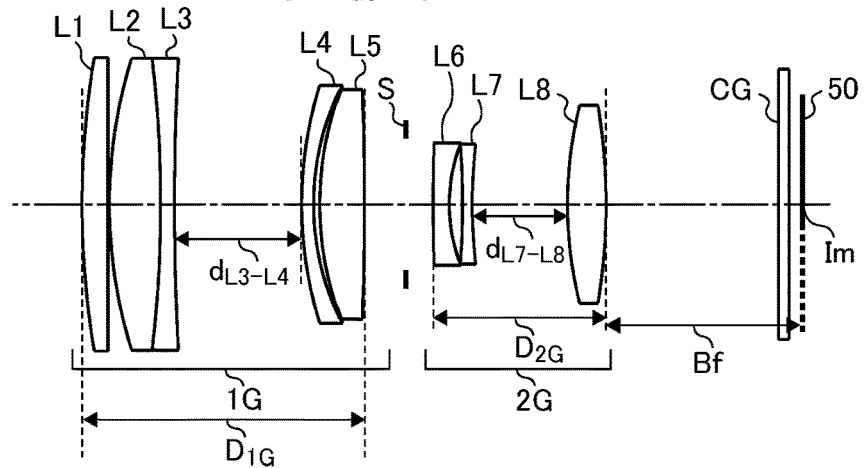
FIG. 5 is an illustration of an image-forming lens according to Example 2.
Figure 6:
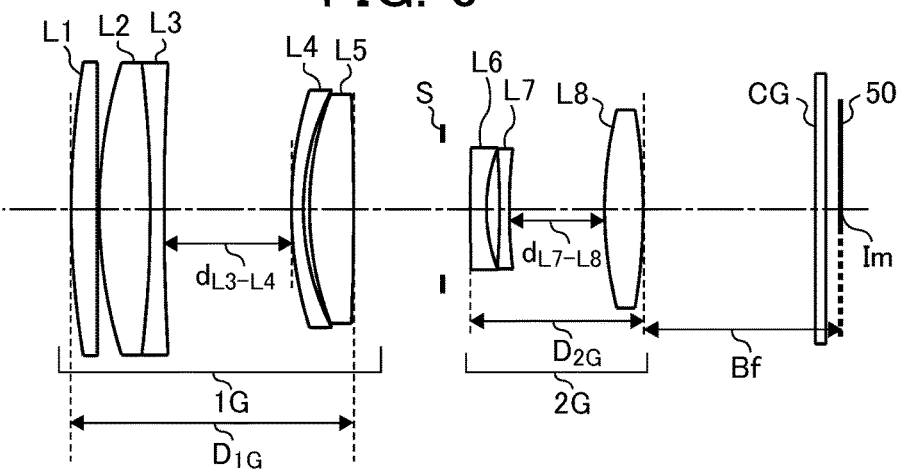
FIG. 6 is an illustration of the image-forming lens according to Example 2 focused at a working distance of 0.25 m.
Figure 7:
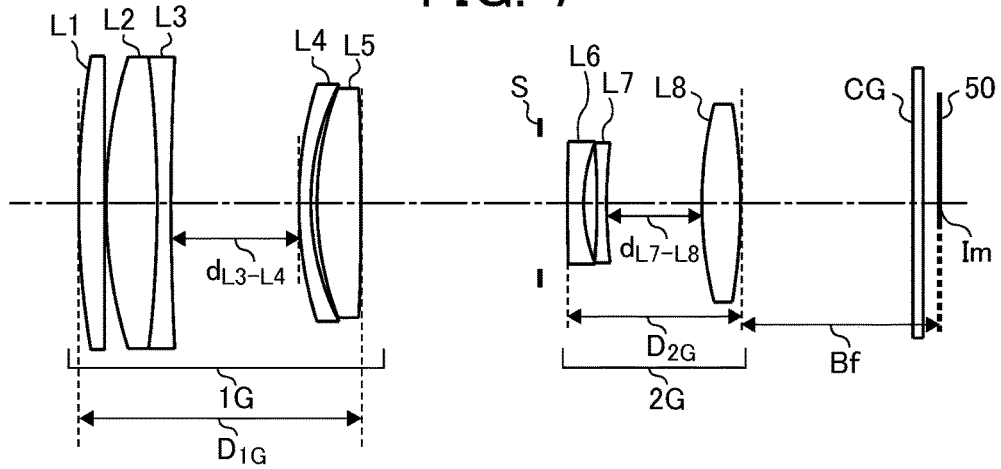
FIG. 7 is an illustration of the image-forming lens according to Example 2 focused at a working distance of 0.10 m.
Figure 8:
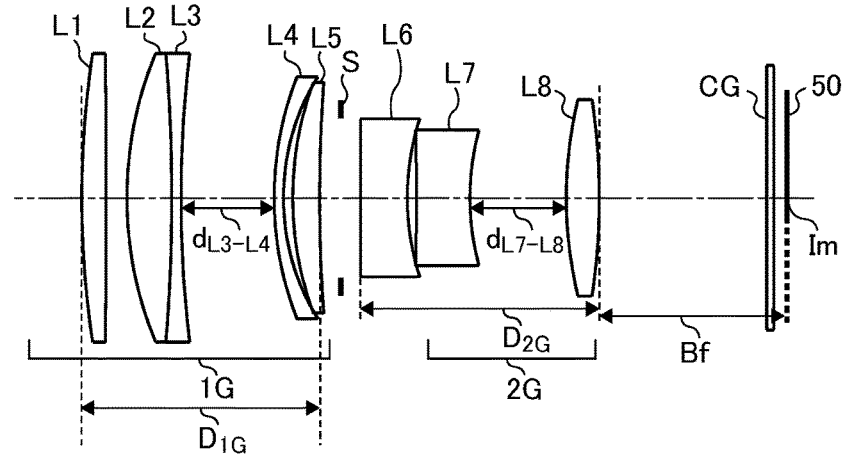
FIG. 8 is an illustration of an image-forming lens according to Example 3.
Figure 9:
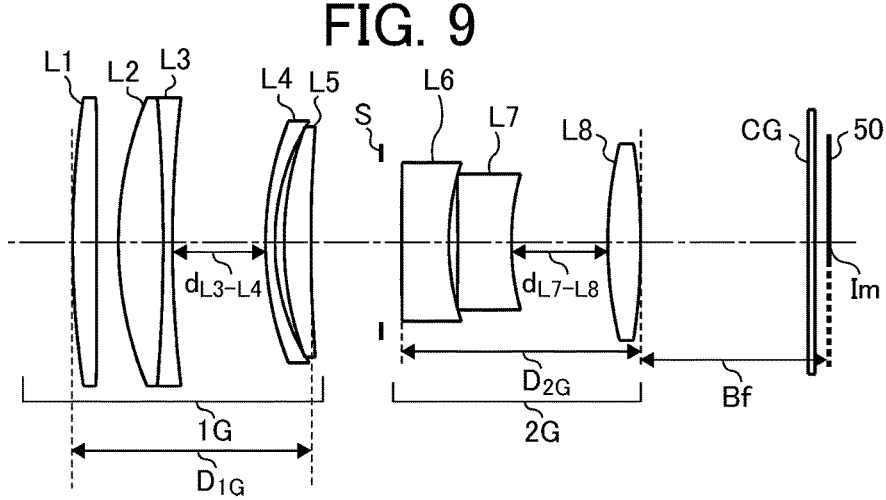
FIG. 9 is an illustration of the image-forming lens according to Example 3 focused at a working distance of 0.25 m.
Figure 10:
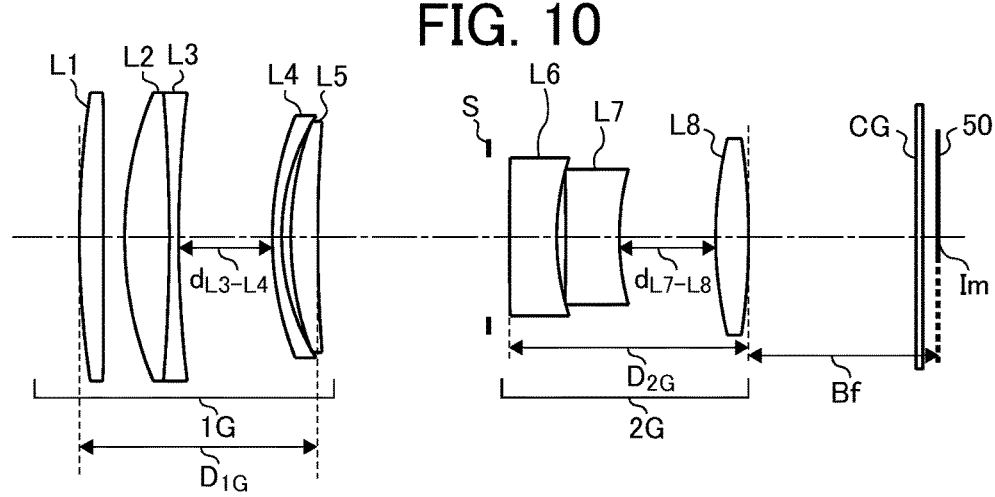
FIG. 10 is an illustration of the image-forming lens according to Example 3 focused at a working distance of 0.10 m.
Figure 11:
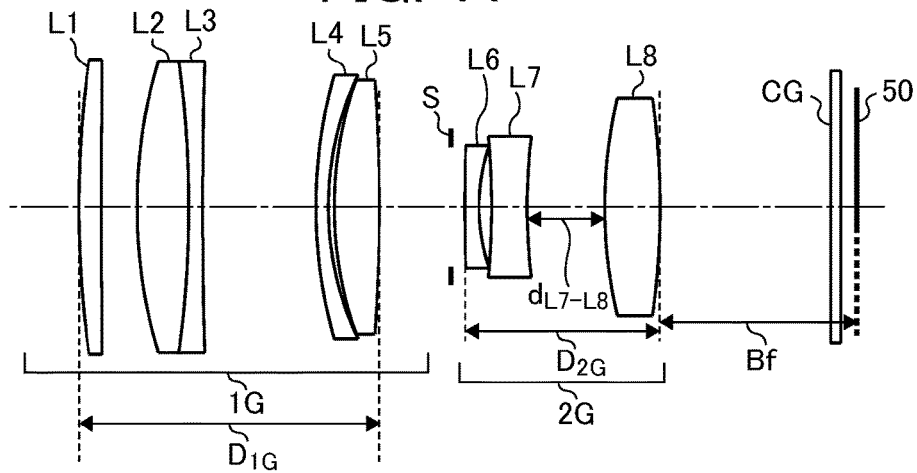
FIG. 11 is an illustration of an image-forming lens according to Example 4.
Figure 12:
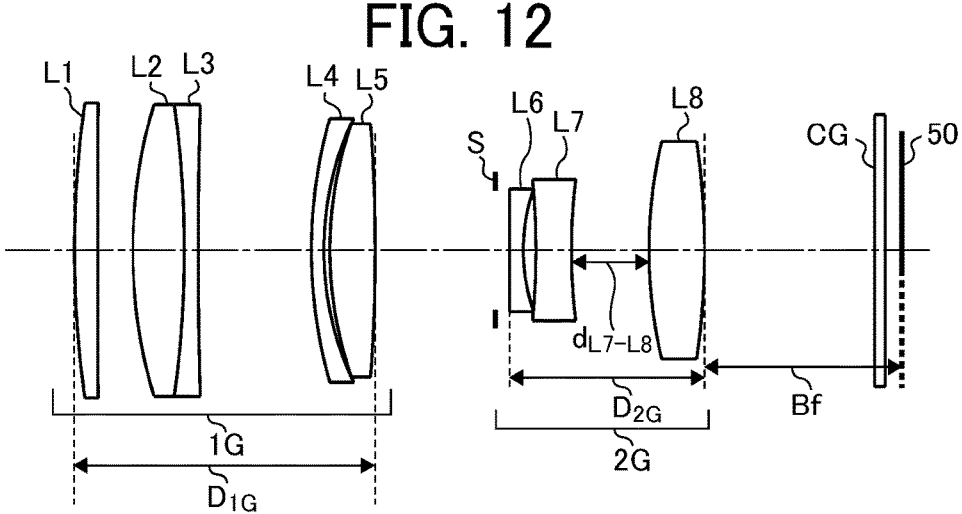
FIG. 12 is an illustration of the image-forming lens according to Example 4 focused at a working distance of 0.25 m.
Figure 13:
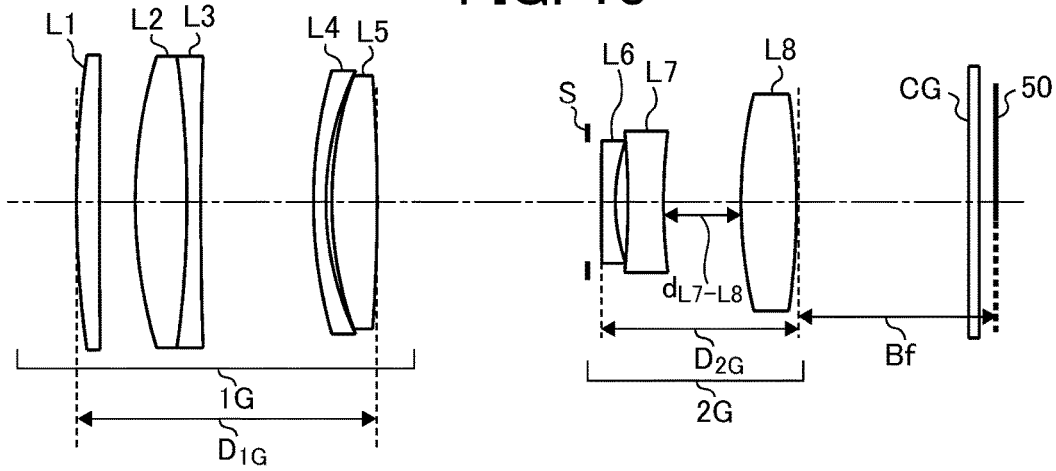
FIG. 13 is an illustration of the image-forming lens according to Example 4 focused at a working distance of 0.10 m.
Figure 14:
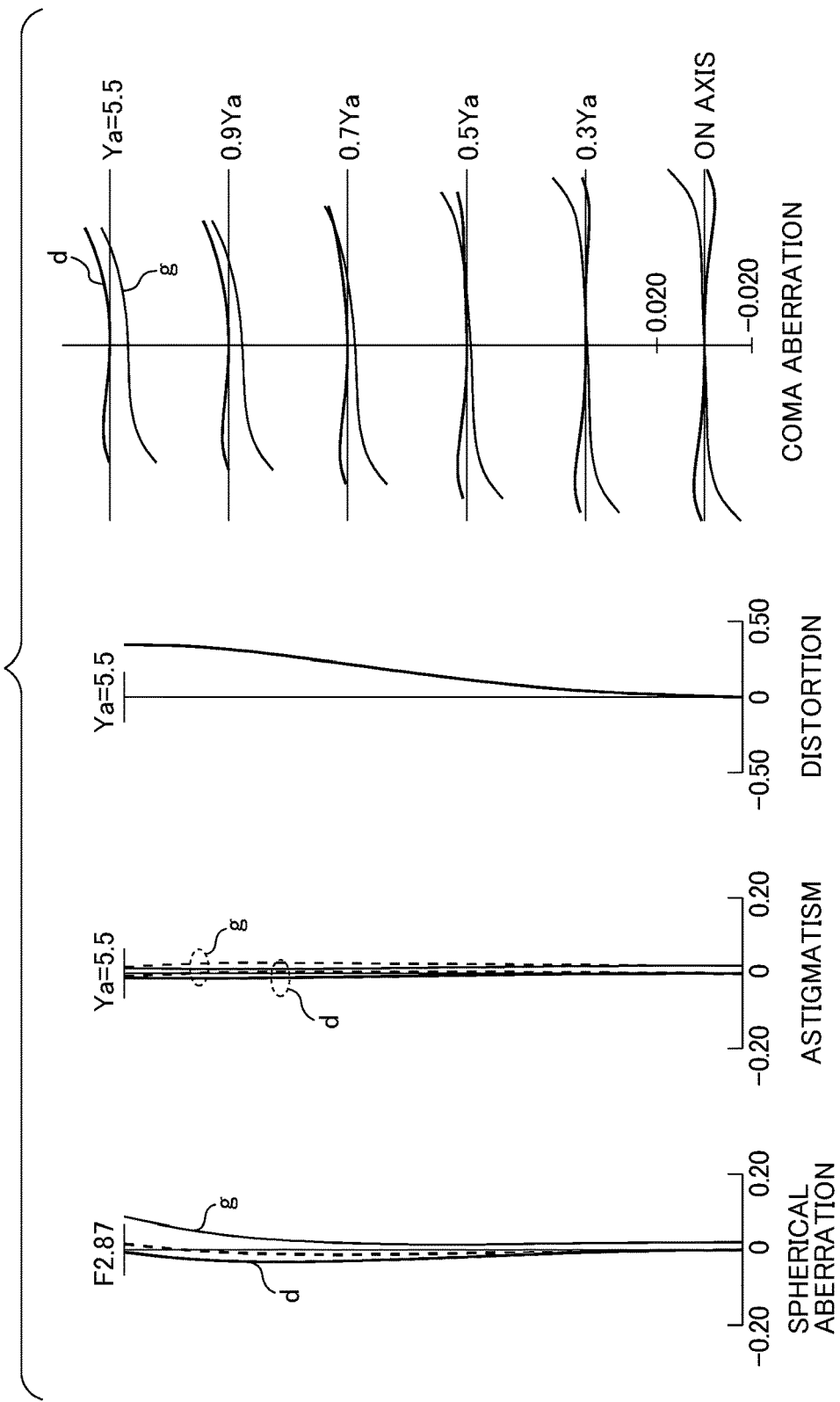
FIG. 14 is an illustration of an example of aberration diagrams of the image-forming lens according to Example 1 focused on an object at infinity.
Figure 15:
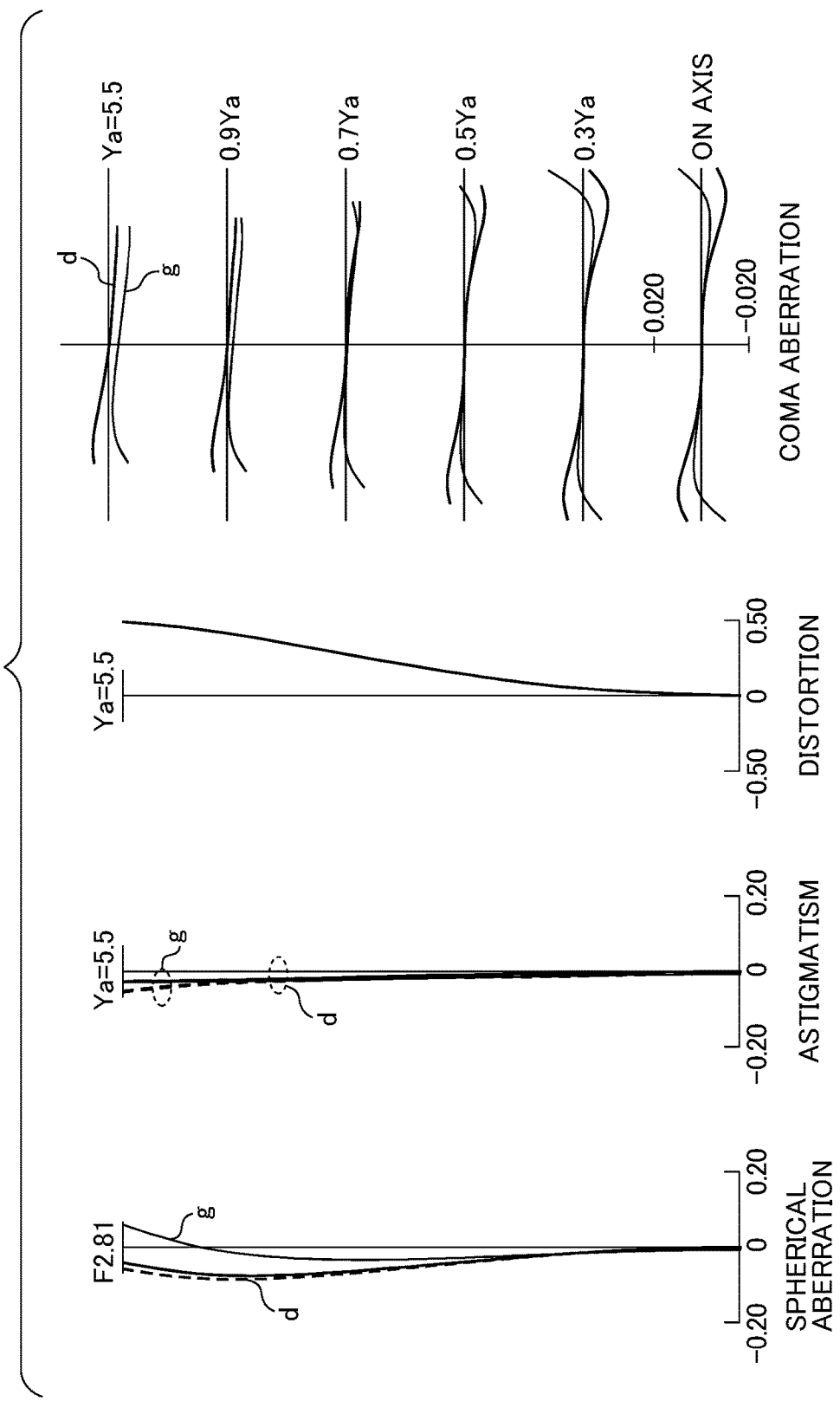
FIG. 15 is an illustration of an example of aberration diagrams of the image-forming lens according to Example 1 focused on an object at a working distance of 0.25 m.
Figure 16:
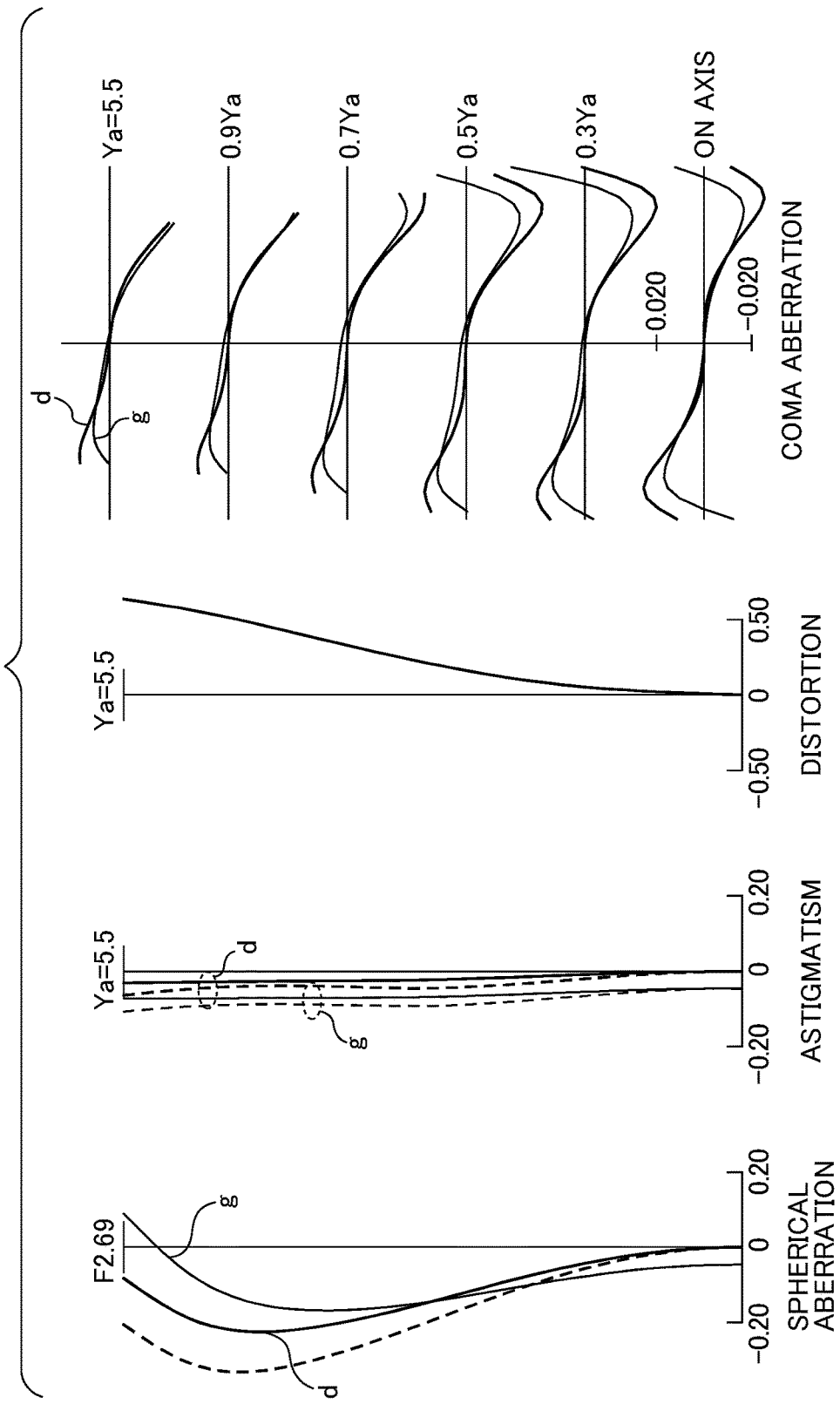
FIG. 16 is an illustration of an example of aberration diagrams of the image-forming lens according to Example 1 focused on an object at a working distance of 0.10 m.
Figure 17:
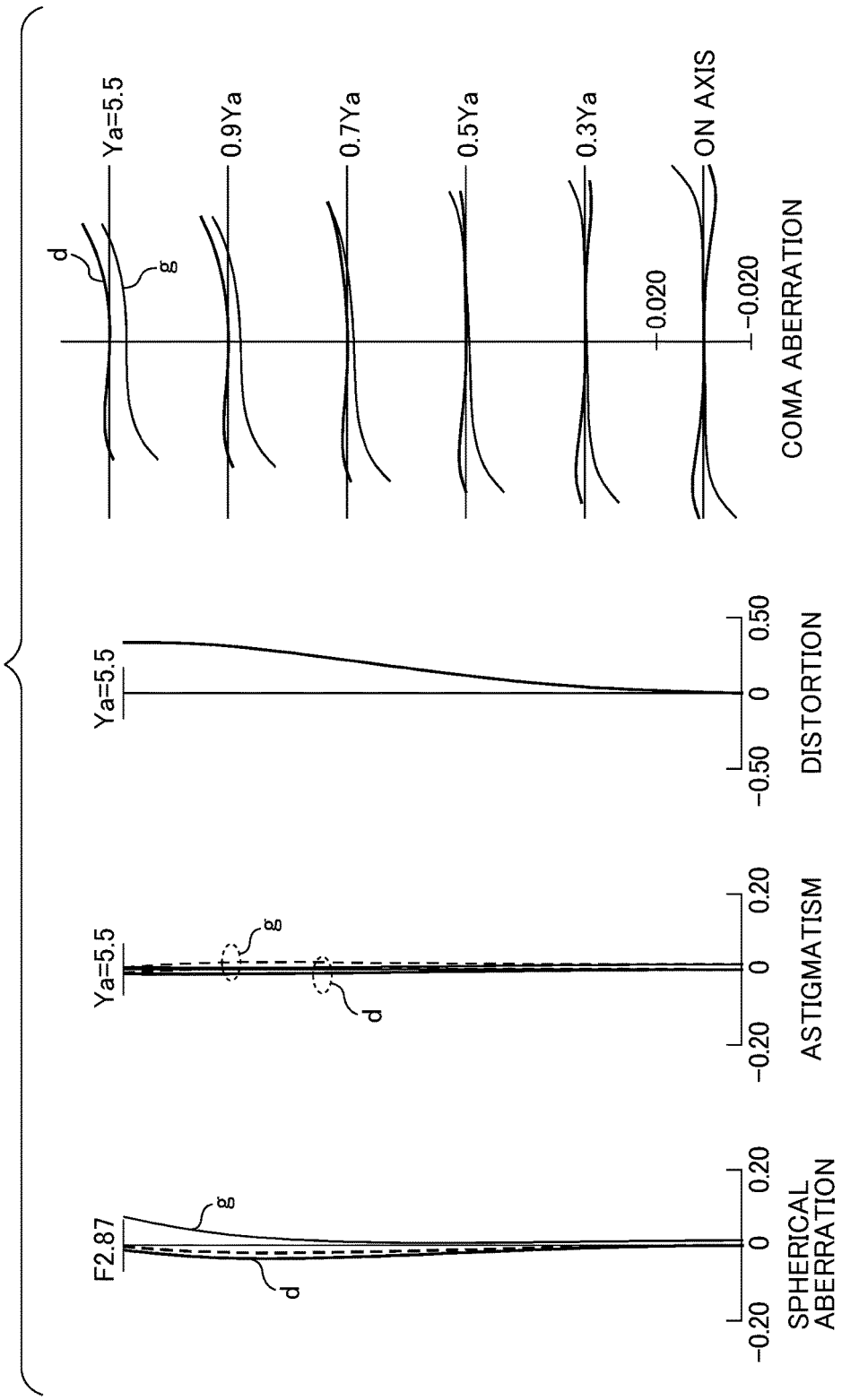
FIG. 17 is an illustration of an example of aberration diagrams of the image-forming lens according to Example 2 focused on an object at infinity.
Figure 18:
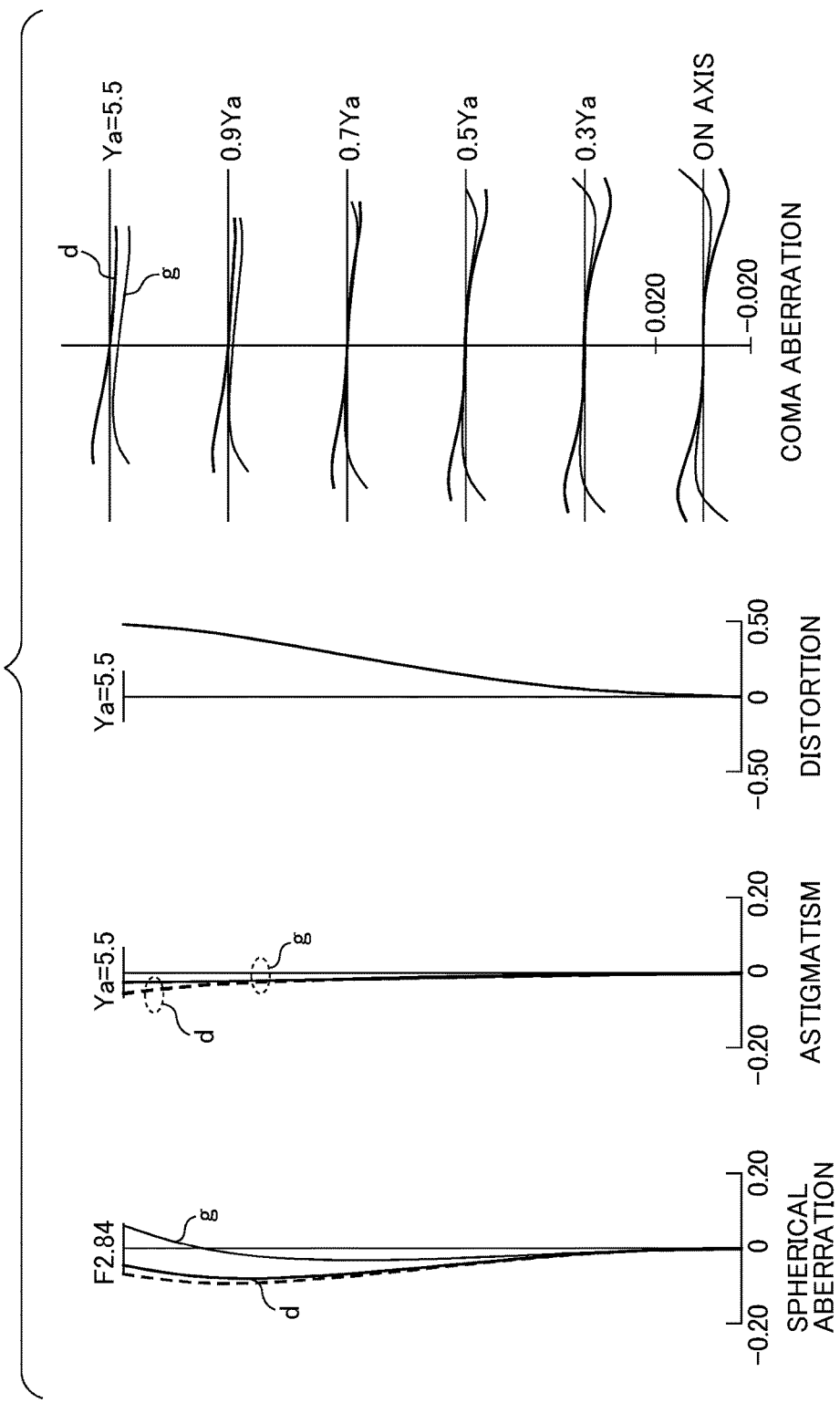
FIG. 18 is an illustration of an example of aberration diagrams of the image-forming lens according to Example 2 focused on the object at the working distance of 0.25 m.
Figure 19:
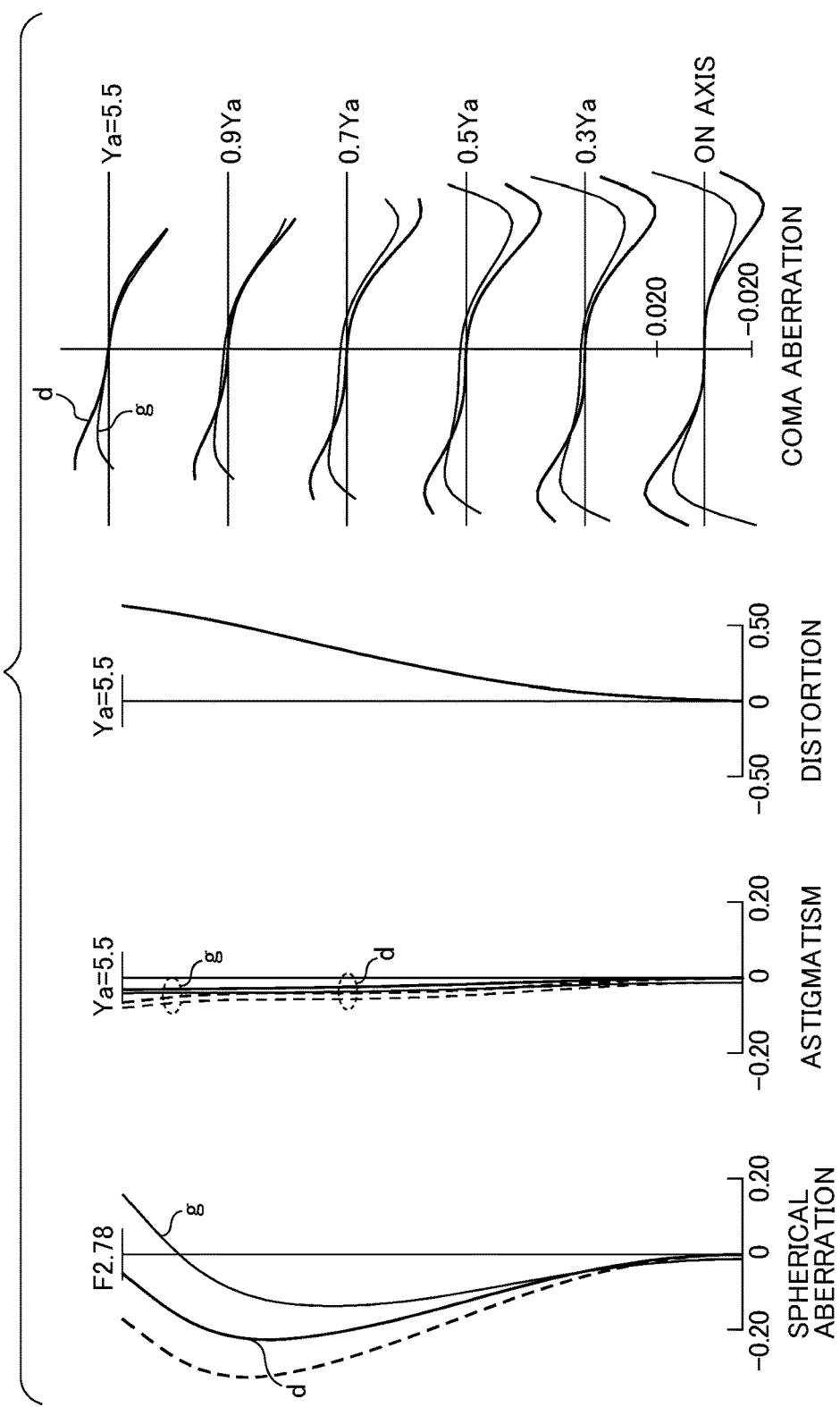
FIG. 19 is an illustration of an example of aberration diagrams of the image-forming lens according to Example 2 focused on the object at the working distance of 0.10 m.
Figure 20:
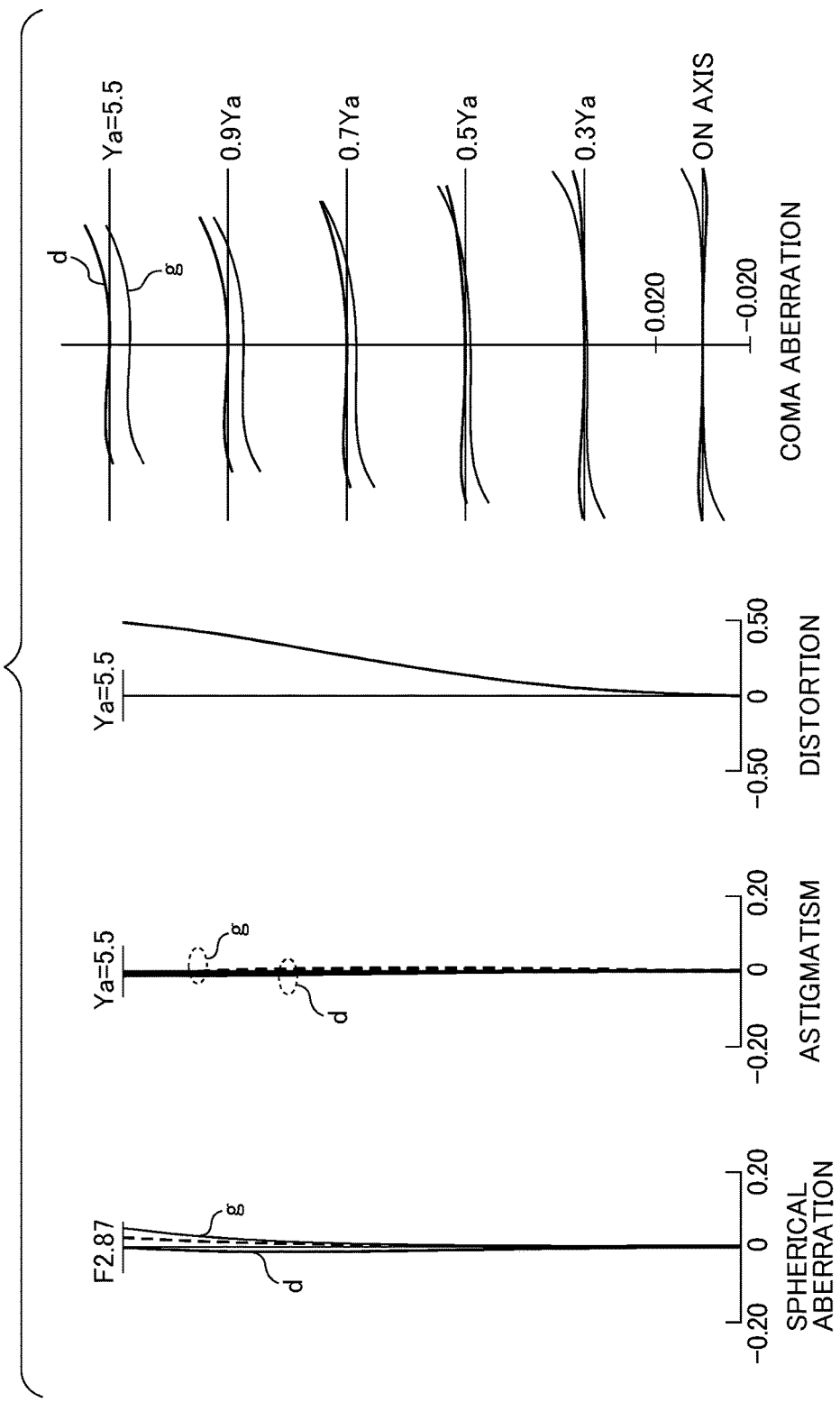
FIG. 20 is an illustration of an example of aberration diagrams of the image-forming lens according to Example 3 focused at an infinite object.
Figure 21:
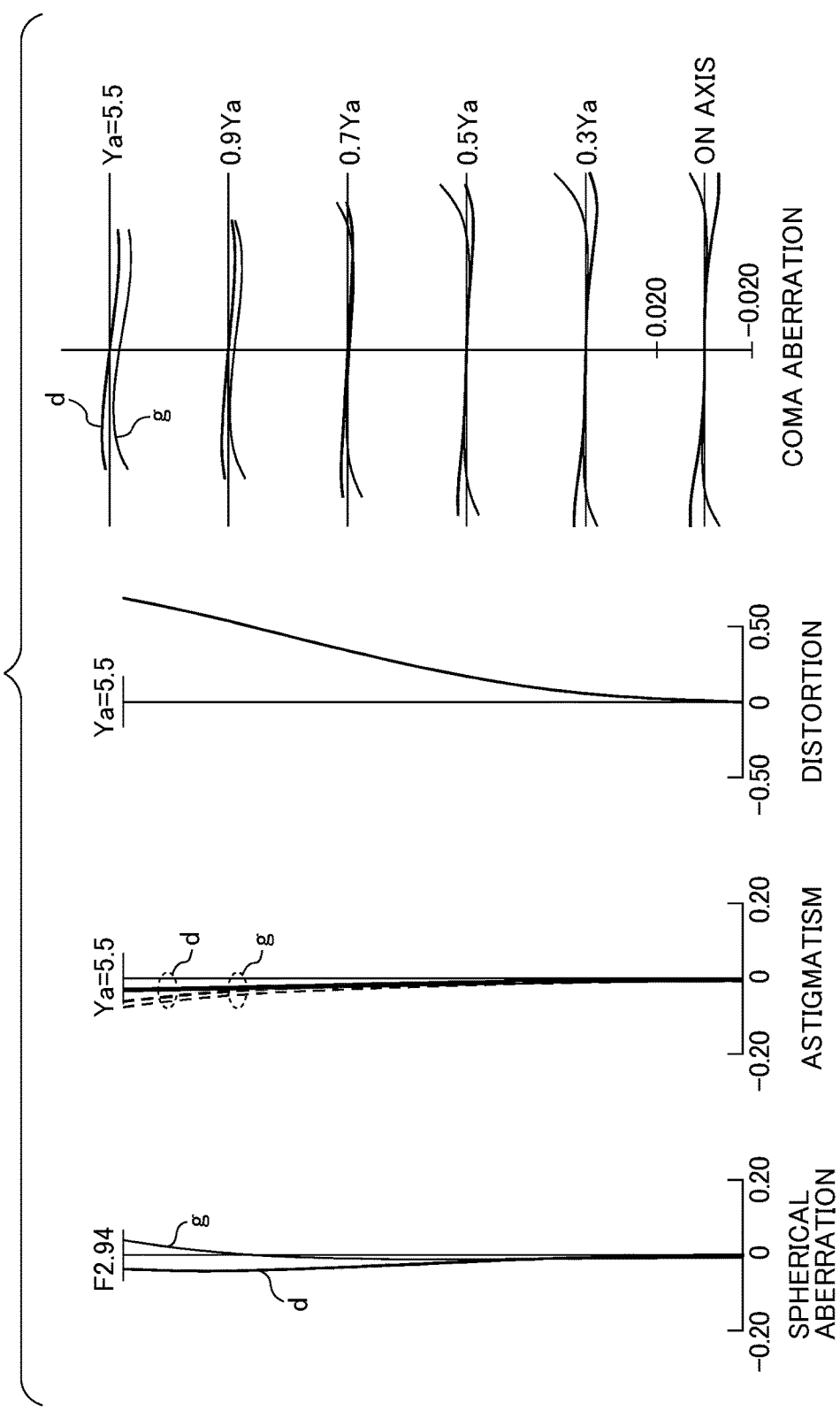
FIG. 21 is an illustration of an example of aberration diagrams of the image-forming lens according to Example 3 focused on the object at the working distance of 0.25 m.
Figure 22:
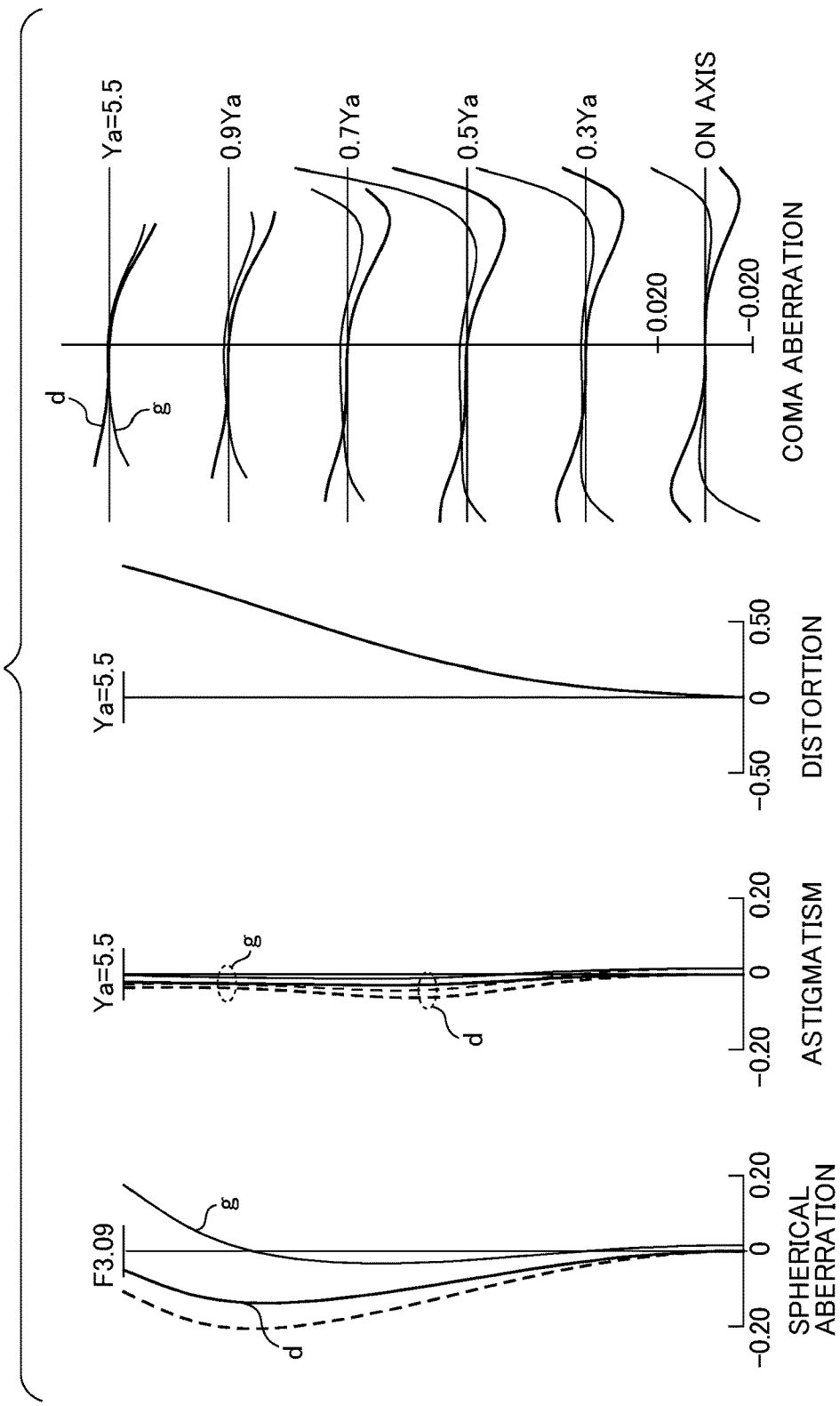
FIG. 22 is an illustration of an example of aberration diagrams of the image-forming lens according to Example 3 focused on the object at the working distance of 0.10 m.
Figure 23:
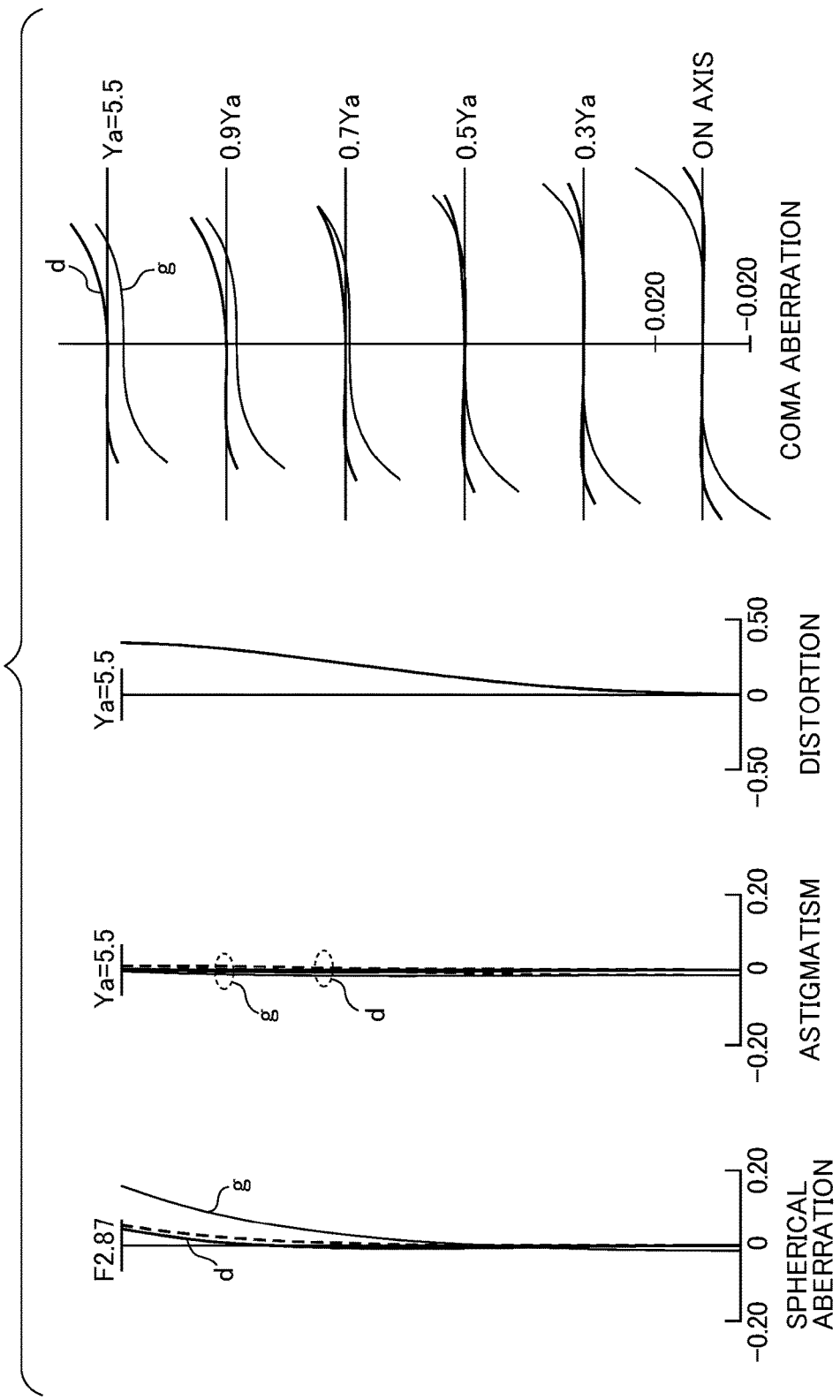
FIG. 23 is an illustration of an example of aberration diagrams of the image-forming lens according to Example 4 focused on an object at infinity.
Figure 24:
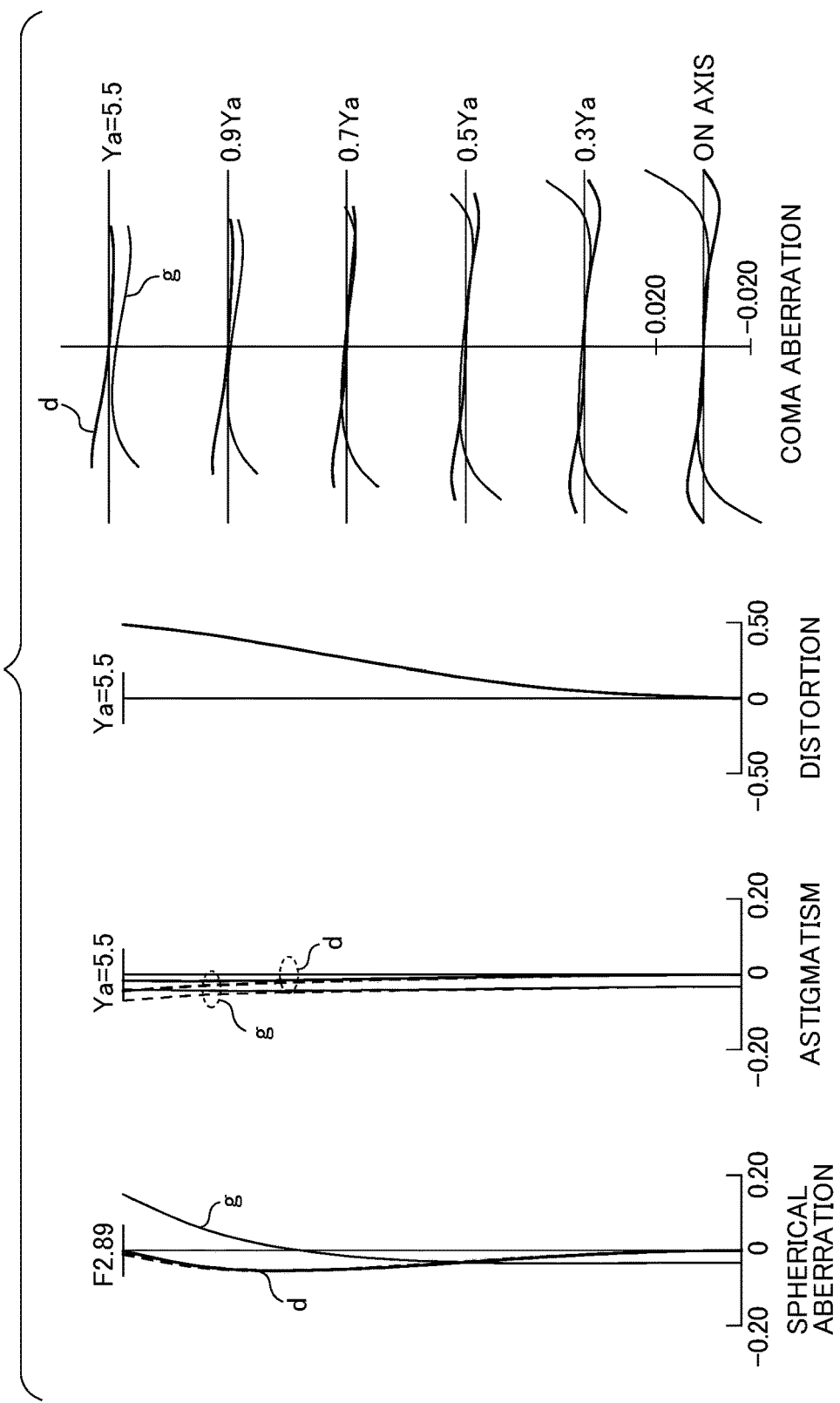
FIG. 24 is an illustration of an example of aberration diagrams of the image-forming lens according to Example 4 focused on the object at the working distance of 0.25 m.
Figure 25:
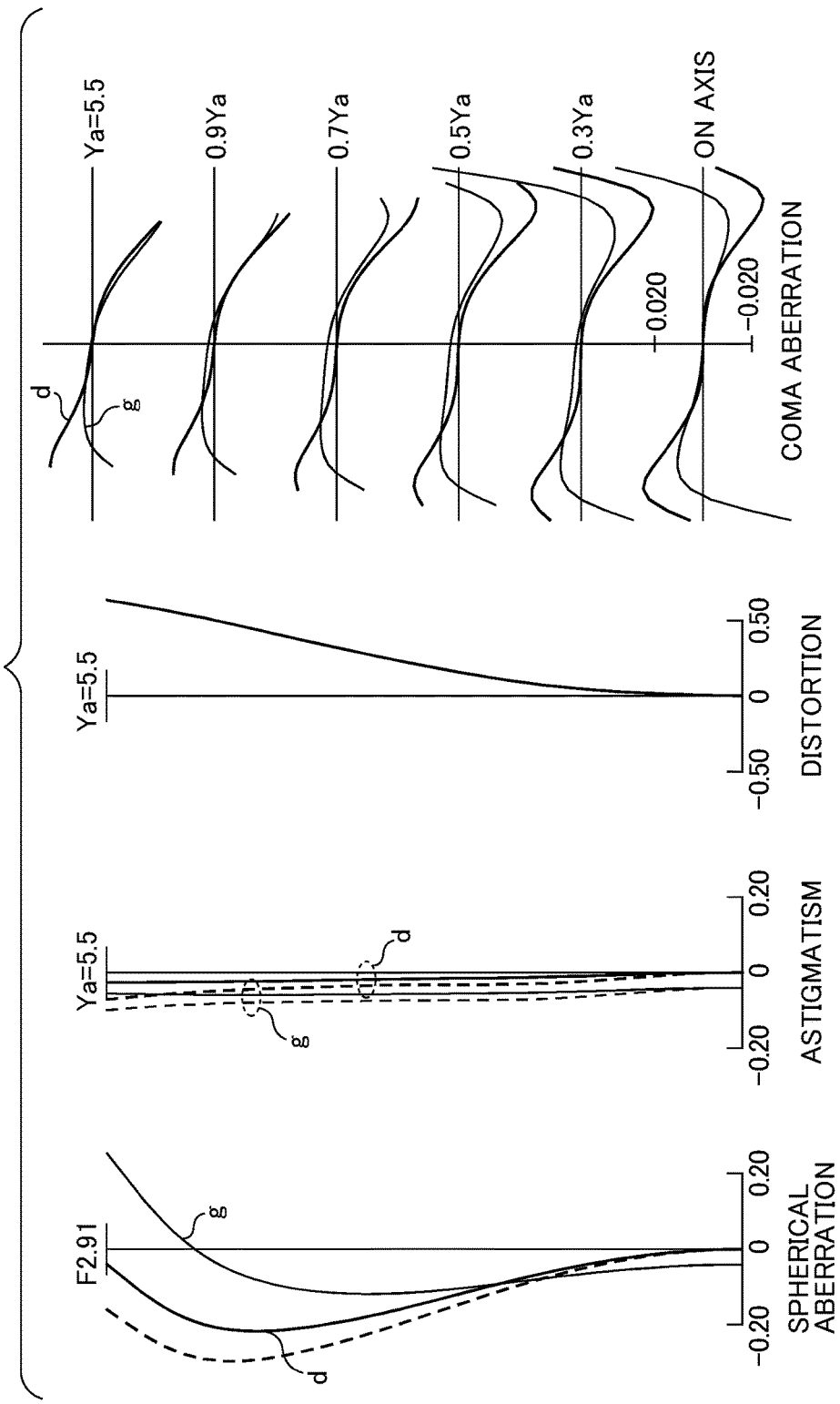
FIG. 25 is an illustration of an example of aberration diagrams of the image-forming lens according to Example 4 focused on the object at the working distance of 0.10 m.

As illustrated in FIG. 2, the image-forming lens 1 includes a first lens group 1G including a plurality of lenses, an aperture stop S, and a second lens group 2G in that order from the object side to the image-plane side.

Further, the first lens group 1G includes a positive lens L1, a positive lens L2, a negative lens L3, a negative lens L4, and a positive lens L5.

The first lens group 1G moves to the object side with respect to the aperture stop S in focusing from an object in infinity to an object at a close distance. Thus, the distance between the first lens group 1G and the aperture stop S is increased to perform focusing from the object in infinity to the object at a close distance. In such focusing, the second lens group 2G and the aperture stop S are stationary with respect to the image plane Im.

Note that, a lens having positive refractive power is referred to as a positive lens, and a lens having negative refractive power is referred to as a negative lens.

The second lens group 2G includes a negative lens L6 having negative refractive power, a negative lens L7, and a positive lens L8 constituting a subgroup having positive refractive power in that order from the object side to the image side.

The negative lens L6 and the negative lens L7 constitute a negative subgroup having negative refracting power.

The image-forming lens 1 according to the present embodiment is assumed to form an image, which passes through a cover glass CG and is imaged by the image sensor 50.

The cover glass CG is a parallel plate, and the image sensor 50 has a light-receiving surface coincides with the image plane Im.

The cover glass CG serves to shield the light-receiving surface of the image sensor 50. In some embodiments, the cover glass CG serves as a shield as well as, for example, an infrared cut filter.

In the present embodiment, the positive lens L1 is a first lens having positive refractive power disposed closest to the object side of the first lens group 1G.

The positive lens L2 is a second lens having positive refractive power.

The negative lens L3 is a third lens having negative refractive power.

The positive lens L2 and the negative lens L3 are integral with each other to form a cemented lens.

The negative lens L4 is a fourth lens having negative refractive power.

The positive lens L5 is a fifth lens having positive refractive power.

That is, the first lens group 1G includes a positive lens L1, a positive lens L2, a negative lens L3, a negative lens L4, and a positive lens L5 sequentially arranged in a direction from the object side to the image-plane side.

With such a configuration including two positive lenses on the object side and two negative lenses arranged in the first lens group 1G, light rays passing through the first lens group 1G are gently bent, which sufficiently corrects spherical aberration and coma aberration due to an increase in lens diameter.

Further, including two negative lenses successfully corrects axial chromatic aberration.

The distance along the optical axis from the image-side surface of the negative lens L3 to the object-side surface of the negative lens L4 is the air space between the third lens and the fourth lens $d_{L3-L4}$.

Further, the physical distance along the optical axis from the object-side surface of the positive lens L1 to the image-side surface of the positive lens L5 refers to the thickness $D_{1G}$ of the first lens group 1G along the optical axis.

In the present embodiment, the first lens group 1G and the entire system of the image-forming lens 1 have focal lengths each satisfying conditional expression (1) below:

$$0.45 < f_{1G}/f < 0.75 \quad (1)$$

In conditional expression (1), $f_{1G}$ is a focal length of the first lens group 1G, and f is a focal length of the entire system of the image-forming lens 1 focused on an object at infinity.

If the focal length of the first lens group 1G excessively increases to exceed the upper-limit value of the range of conditional expression (1), the length of move of the first lens group 1G in focusing on the work WK at the short distance increases, which disadvantageously increases the size of the entire system of the image-forming lens 1. Further, the power imposed on the second lens group G2 with respect to the entire system increases, which might lead to an imbalance between aberrations as a whole, resulting in a deterioration in optical performance of the image-forming lens 1.

If the focal length of the first lens group 1G excessively decreases to fall below the lower-limit value of the range of conditional expression (1), the focal length of the first lens group G1 becomes too short with respect to the focal length of the entire system of the image-forming lens 1 focused on the object at infinity, which hampers the aberration correction of the first lens group 1G.

In view of the above circumstances, in the present embodiment, the first lens group 1G constitutes the image-forming lens 1 within the range of conditional expression (1). Such a configuration defines the focal length $f_{1G}$ of the first lens group 1G with respect to the focal length f of the entire system of the image-forming lens 1 focused on the object at infinity, thereby eliminating the change in the optical performance of the image-forming lens 1 due to focusing.

In the image-forming lens 1 according to at least one embodiment of the present disclosure, the ratio of the distance $d_{L3-L4}$ along the optical axis between the negative lens L3 and the negative lens L4 with respect to the thickness $D_{1G}$ of the first lens group 1G along the optical axis satisfies conditional expression (2) below:

$$0.30 < d_{L3-L4}/D_{1G} < 0.55. \quad (2)$$

The light beam that passes through the first lens group 1G has a greater diameter than the diameter of the light beam that passes through the second lens group 2G, and spherical aberration and coma aberration are more likely to occur in the light beam that passes through the first lens group 1G.

To avoid the occurrence of the spherical aberration and coma aberration in the first lens group 1G, the distance between the negative lens L3 as the third lens and the negative lens L4 as the fourth lens in the first lens group 1G is defined to satisfy the range of conditional expression (2).

If the distance $d_{L3-L4}$ along the optical axis between the negative lens L3 and the negative lens L4 excessively increases to exceed the upper-limit value of the range of conditional expression (2), the lens shape of each lens of the first lens group 1G is restricted, which hampers the aberration correction. By contrast, if the distance $d_{L3-L4}$ along the optical axis excessively decrease to fall below the lower-limit value of the range of conditional expression (2), the correction of spherical aberration and coma aberration are difficult as well.

The configuration according to the embodiment of the present disclosure reduces aberrations in the image-forming lens 1 and prevents the change in optical performance of the image-forming lens 1 due to focusing.

In the present embodiment, at least one positive lens of the first lens group 1G satisfies conditional expressions (3) through (5) below:

$$1.40 < n_d < 1.63; \quad (3)$$

$$60.0 < v_d < 95.0; \text{ and} \quad (4)$$

$$0.005 < \theta_{g,F} - (-0.001742 * v_d + 0.6490) < 0.060 \quad (5)$$

where $n_d$ is a refractive index of the d line, vd is Abbe number of the d line, and $\theta_{g,F}$ is a partial dispersion ratio obtained by dividing the difference between a refractive index $n_g$ of the g line and a refractive index $n_F$ of the F line by the difference between a refractive index $n_F$ and a refractive index $n_C$ of the C line $((\theta_{g,F} = n_g - n_F)/(n_F - n_C))$.

The above-described conditional expressions (3) through (5) define the anomalous dispersibility of the glass type. By preparing at least one positive lens of the first lens group 1G with lens material having such dispersion characteristics, chromatic aberration is easily corrected.

As described above, a thick light beam passes through high positions of the lens surfaces of the first lens group 1G, and accordingly the axial chromatic aberration is more likely to occur in the first lens group 1G. Further, as the focal length of the entire system of the image-forming lens 1 increases, the axial chromatic aberration is more likely to occur. In view of the above circumstances, the first lens group 1G is produced by lens material that satisfies the above-described conditional expressions (3) through (5), thereby eliminating the occurrence of chromatic aberration, to thus correct aberrations successfully.

Further, the image-forming lens 1 of the embodiments of the present disclosure includes a cemented lens formed by joining the positive lens L2 with the negative lens L3.

With such a configuration, the amount of eccentricity is eliminated or reduced, thereby increasing the accuracy of the image-forming lens 1.

In the present embodiment, the aperture stop S and the second lens group 2G are stationary with respect to the image plane Im during the focusing of the image-forming lens 1. Thus, the distance between the aperture stop S and the second lens group 2G is stationary.

Such a configuration simplifies the moving mechanism in focusing, and facilitates obtaining the extended amount of the first lens group 1G.

In the present embodiment, the image-forming lens 1 is configured such that the ratio of the focal length $f_{L3}$ of the negative lens L3 with respect to the focal length $f_{L4}$ of the negative lens L4 satisfies conditional expression (6) below:

$$0.65 < f_{L3}/f_{L4} < 1.30. \tag{6}$$

Such a configuration does not disturb the balance of the power generated between the negative lenses of the two negative lenses included in the first lens group 1G, which facilitates correcting aberrations.

In image-forming lens 1 according to the present embodiment, the radius of curvature $R_{L4S2}$ of the image-side lens surface S2 of the negative lens L4 and the radius of curvature $R_{L5S1}$ of the object-side lens surface S1 of the positive lens L5 satisfy conditional expression (7) below:

$$0.05 < (R_{L5S1} - R_{L4S2})/(R_{L5S1} + R_{L4S2}) < 0.30. \tag{7}$$

If the value of $(R_{L5S1} - R_{L4S2})/(R_{L5S1} + R_{L4S2})$ exceeds the upper limit of conditional expression (7), spherical aberration is likely to occur on an over side. Further, outward coma aberration is likely to occur.

If the value of $(R_{L5S1} - R_{L4S2})/(R_{L5S1} + R_{L4S2})$ falls below the lower limit of conditional expression (7), the radius of curvature of the image-side lens surface S2 of the negative lens L4 approximates the radius of curvature of the object-side lens surface S1 of the positive lens L5, so that spherical aberration correction becomes insufficient and inward coma aberration is likely to occur.

Such a configuration defines each shape of the image-side lens surface S2 of the negative lens L4 and the object-side lens surface S1 of the positive lens L5 within the range of conditional expression (7), thereby allowing a successful correction of aberrations in the image-forming lens 1.

The following describes the configuration of the second lens group 2G.

The second lens group 2G, which is disposed on the image-plane side of the aperture stop S, includes a negative lens L6 as a sixth lens, a negative lens L7 as a seventh lens, and a positive lens L8 as an eighth lens. The sixth lens and the seventh lens have negative refractive power, and the eighth lens has positive refractive power.

The negative lens L6 and the negative lens L7 are disposed to provide a predetermined air space therebetween, and constitute a negative subgroup in the second lens group 2G.

The positive lens L8 serves as the last lens in the image-forming lens 1 to guide light rays having appropriate incident angles to the image plane.

As described above, the negative lens L6 and the negative lens L7 constituting the negative subgroup are disposed in the second lens group 2G, the light rays passing through the negative lens L6 and the negative lens L7 are more gently bent, thereby allowing a successful correction of aberrations, as compared to the case in which a single negative lens is disposed.

The second lens group 2G is configured such that the radius of curvature $R_{L7S1}$ of the object-side lens surface S1 of the negative lens L7 and the radius of curvature $R_{L6S2}$ of the image-side lens surface S2 of the negative lens L6 satisfy the range of conditional expression (8) below:

$$0.50 < (R_{L7S1} + R_{L6S2})/(R_{L7S1} - R_{L6S2}) < 0.95. \tag{8}$$

If the value of $(R_{L7S1} + R_{L6S2})/(R_{L7S1} - R_{L6S2})$ exceeds the upper limit of conditional expression (8), outward coma aberration is more likely to occur.

If the value of $(R_{L7S1} + R_{L6S2})/(R_{L7S1} - R_{L6S2})$ falls below the lower limit of conditional expression (8), inward coma aberration is more likely to occur.

Further, the balance of astigmatism tends to collapse outside the range of conditional expression (8).

Such a configuration prevents or reduces the change in optical performance of the image-forming lens 1 due to focusing.

The second lens group G2 satisfies the range of conditional expression (9) below:

$$0.15 < d_{L7-L8}/L_{2G} < 0.35 \tag{9}$$

where $d_{L7-L8}$ denotes the distance along the optical axis from the image-side lens surface S2 of the negative lens L7 to the object-side lens surface S1 of the positive lens L8, and $L_{2G}$ denotes the physical distance along the optical axis from the object-side lens surface S1 of the negative lens L6 to the image plane Im.

If the value of $d_{L7-L8}/L_{2G}$ exceeds the upper limit of conditional expression (9), the distance from the positive lens L8 to the image plane Im becomes shorter than the distance between the negative lens L7 and the positive lens L8 of the second lens group 2G, so that the light rays have to be sharply bent at the image-side lens surface S2 of the positive lens L8 and accordingly the aberration correction is difficult.

Further, if the value of $d_{L7-L8}/L_{2G}$ falls below the lower limit of conditional expression (9), the light rays have to be sharply bent at the object-side lens surface S1 of the positive lens L8, which hampers a successful correction of aberrations.

In the present embodiment, the second lens group 2G is configured to satisfy the range of conditional expression (9), thereby allowing the successful correction of aberration while obtaining an appropriate incident angle with respect to the image plane Im to obtain a high quality image.

Preferably, the lenses constituting the image-forming lens 1 according to at least one embodiment of the present are all spherical lenses. This configuration reduces the cost for the molding die, which is advantageous to the small-lot production.

In the present embodiment, the material of all the lenses constituting the first lens group 1G and the second lens group 2G is inorganic solid material. This configuration eliminates or reduces the change in the optical properties due to the environmental conditions such as temperature and humidity, thus reducing the influence of the changes in environmental conditions on the image-forming lens 1.

EXAMPLES

The following describes Examples 1 through 4 as concrete examples of the image-forming lens 1 as illustrated in FIGS. 2 through 13.

In the following description, the meanings of the symbols are as follows:

F: F number;
Ya: image height;
R: radius of curvature;

D: surface distance;
$N_d$: refractive index of d line;
$v_d$: Abbe number of d line;
BF: back focus;
$\theta_{F,g}$: partial dispersion ratio;
ω: half angle of view; and
WD: working distance (the distance from the work WK to the object-side lens surface S1 of the positive lens L1).

Examples 1 through 4 are numerical examples in which the image-forming lens 1 satisfies conditional expression (1). Further, the image-forming lens 1 according to Examples 1 through 4 satisfies any or all of conditional expressions (2) through (9), in addition to conditional expression (1). However, no limitation is intended thereby.

In each of Examples 1 through 4, the aberration is corrected at a high level, and the change in the curvature of field during the focusing is successfully eliminated or reduced.

The spherical aberration shifts in a minus direction with focusing of the image-forming lens 1, but the amount of change is extremely small.

Further, axial chromatic aberration and lateral chromatic aberration are also small, and coma aberration is well eliminated up to the most peripheral portion of the lenses. In addition, the absolute value of the distortion aberration is 0.9% or less.

That is, any image-forming lens 1 according to Examples 1 through 4 has various aberrations sufficiently reduced. Specifically, the image-forming lens 1 has an angle of view (2ω) of 12.5° and an F number of 2.8, including, for example, eight lenses with a resolution that corresponds to an image sensor of 10 million pixel. The image-forming lens 1 is capable of drawing a straight line from an object at infinity to an object at a short distance with a working distance of 0.1 m, with a little change in optical performance during focusing.

Numerical Example 1

In Example 1, the focal length is 50.00 millimeters (mm), the F number is 2.87, and the half angle of view ω is 6.3 degrees FIGS. 28 through 39 are illustrations of Tables 1 through 12.

Table 1 of FIG. 28 represents data regarding the image-forming lens 1 according to Example 1. Table 2 of FIG. 29 represents data regarding the variable distance (space) expressed by the term "VARIABLE (A)" in a column of D and a row of 9 in Table 1. The variable distance is a space between the first lens group 1G and the aperture stop S.

In Table 2, the symbol "WD" denotes the working distance, and the symbol "A" denotes variable distance. Further, the row of "A" represents a variable distance for the image-forming lens 1 focused on the object at infinity, a variable distance for the working distance of 0.25 m, and a variable distance for the working distance of 0.10 m.

Table 3 of FIG. 30 represents numerical values of conditional expressions (1) through (9) according to Example 1. In Table 3, Table 6 of FIG. 33, Table 9 of FIG. 36, and Table 12 of FIG. 39, for example, the radius of curvature of the object-side lens surface S1 of the positive lens L5 is expressed by $R_{L5sur.1}$ and the radius of curvature of the image-side lens surface S2 of the negative lens L4 is expressed by $R_{L4sur.2}$. The same applies to the other lenses.

Numerical Example 2

In Example 2, the focal length is 50.00 mm, the F number is 2.87, and the half angle of view ω is 6.3 degrees.

Table 4 of FIG. 31 represents data regarding the image-forming lens 1 according to Example 2. Table 5 of FIG. 32 represents data regarding the variable distance expressed by the term "VARIABLE (A)" in a column of D and a row of 9 in Table 4. The variable distance is a space between the first lens group 1G and the aperture stop S.

In Table 5, the symbol "WD" denotes the working distance, and the symbol "A" denotes variable distance. Further, the row of "A" represents a variable distance for the image-forming lens 1 focused on the object at infinity, a variable distance for the working distance of 0.25 m, and a variable distance for the working distance of 0.10 m.

Table 6 of FIG. 30 represents numerical values of conditional expressions (1) through (9) according to Example 2.

Numerical Example 3

In Example 3, the focal length is 50.00 mm, the F number is 2.87; and the half angle of view ω is 6.2 degrees.

Table 7 of FIG. 34 represents data regarding the image-forming lens 1 according to Example 3. Table 8 of FIG. 35 represents data regarding the variable distance expressed by the term "VARIABLE (A)" in a column of D and a row of 9 in Table 7. The variable distance is a space between the first lens group 1G and the aperture stop S.

In Table 8, the symbol "WD" denotes the working distance, and the symbol "A" denotes variable distance. Further, the row of "A" represents a variable distance for the image-forming lens 1 focused on the object at infinity, a variable distance for the working distance of 0.25 m, and a variable distance for the working distance of 0.10 m.

Table 9 of FIG. 36 represents numerical values of conditional expressions (1) through (9) according to Example 3.

Numerical Example 4

In Example 4, the focal length is 50.00 mm, the F number is 2.87, and the half angle of view ω is 6.3 degrees.

Table 10 of FIG. 37 represents data regarding the image-forming lens 1 according to Example 4. Table 11 of FIG. 38 represents data regarding the variable distance expressed by the term "VARIABLE (A)" in a column of D and a row of 9 in Table 10. The variable distance is a space between the first lens group 1G and the aperture stop S.

In Table 11, the symbol "WD" denotes the working distance, and the symbol "A" denotes variable distance. Further, the row of "A" represents a variable distance for the image-forming lens 1 focused on the object at infinity, a variable distance for the working distance of 0.25 m, and a variable distance for the working distance of 0.10 m.

Table 12 of FIG. 39 represents numerical values of conditional expressions (1) through (9) according to Example 4.

FIGS. 14 through 25 are aberrations diagrams of four image-forming lenses 1 according to Examples 1 through 4.

FIGS. 14, 17, 20, and 23 are illustrations of aberration curves of the image-forming lens 1 according to Examples 1 through 4 focused at infinity, respectively. FIGS. 15, 18, 21, and 24 are illustrations of aberration curves of the image-forming lens according to Examples 1 through 4 focused on an object at a working distance of 0.25 m. FIGS. 16, 19, 22, and 25 are illustrations of aberration curves of the image-forming lens according to Examples 1 through 4 focused on an object at a working distance of 0.10 m.

Further, the broken line in the spherical aberration diagram represents the sine condition, the solid line in the astigmatic aberration diagram represents sagittal, and the broken line represents meridional.

As illustrated in the aberration diagrams according to each Example, the aberrations are corrected at a high level, and the change in the curvature of field during the focusing is eliminated or reduced in each Example.

Axial chromatic aberration and lateral chromatic aberration are also sufficiently small, and coma aberration and variance in the color difference are well eliminated up to the most peripheral area of the lenses.

That is, in any image-forming lens 1 according to Examples 1 through 4 has various aberrations sufficiently reduced, having a resolution corresponding to an image sensor of 10 million pixels. Further, any image-forming lens 1 according to Examples 1 through 4 has the absolute value of distortion aberration of less than 0.9%, having a high-performance with little change in optical performance due to focusing.

Figure 26:
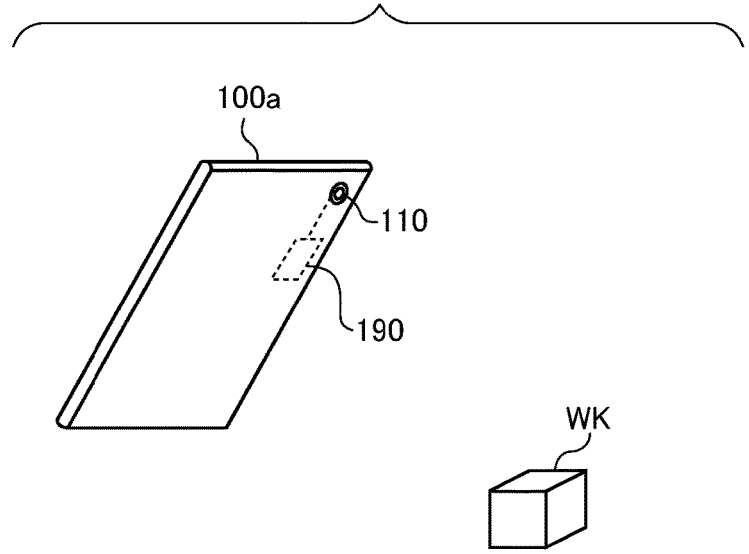
FIG. 26 is an illustration of an imaging device according to another embodiment of the present disclosure.
Figure 27:
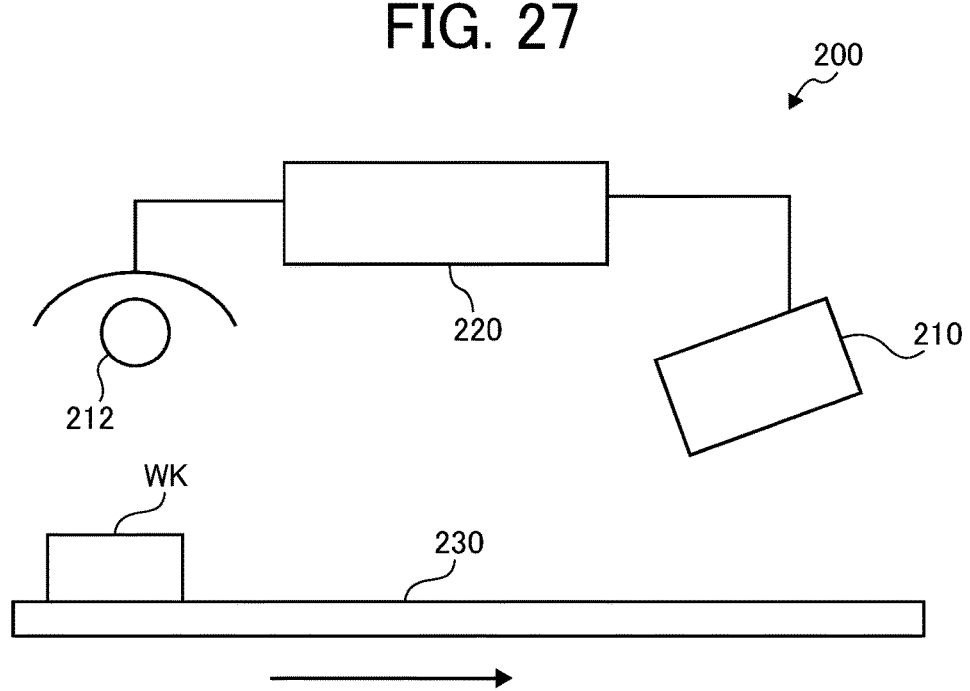
FIG. 27 is an illustration an example an inspection apparatus including the image-forming lens.

The following describes a mobile terminal 100a as an example of a mobile information terminal that includes the image-forming lens 1 as an imaging optical system, with reference to FIG. 26.

The mobile terminal 100a is an information communication terminal including a camera function unit 110 serving as an imaging unit on the back side and a controller 190.

In taking a picture of a work WK as an object, the user operates an operation panel of the mobile terminal 100a with the camera function unit 110 oriented toward the work WK, to thus operate the camera function unit 110 via the controller 190.

The camera function unit 110 serves as an imaging device 100 that includes the above-described image-forming lens 1 according to any of Example 1 through 4 as the imaging optical system.

The camera function unit 110 serves to drive the first lens group 1G of the image-forming lens 1 according to an instruction of the controller 190 to adjust the focal length of the entire system of the image-forming lens 1 so as to successfully take a picture of the work WK.

The controller 190 configured as a computer or central processing unit (CPU) drives the first lens group 1G and controls the flashing of an illumination device 120, and further controls focusing of the image-forming lens 1 and an image acquisition of the image sensor within the camera function unit 110.

As described above, the configuration according to at least one embodiment of the present disclosure achieves an improved image-forming lens and imaging device provided with such an image-forming lens.

The following describes an inspection apparatus 200 as one example including an imager with the image-forming lens 1 according to at least one embodiment of the present disclosure as an imaging optical system, used to perform an inspection.

The inspection apparatus 200 includes an imaging device 210 provided with an imaging optical system, a controller 220, and an illumination device 212 that illuminates a target to be imaged by the imaging device 210 according to an instruction of the controller 220.

The inspection apparatus 200 inspects a product by causing the controller 220 to control the imaging device 210 to image the work WK as an inspection target that is being conveyed in a direction from left to right of the drawing sheet by a conveyor 230 and inputting an image.

The imaging device 210 includes the image-forming lens 1 according to any of Examples 1 through 4, as an imaging optical system.

The controller 220 configured as a computer or a CPU drives the conveyor 230 and controls the flashing of the illumination device 212, and further controls focusing of the image-forming lens 1 and an image acquisition of the image sensor within the imaging device 210.

Products of various sizes are inspection targets as a work WK. The controller 220 specifies an appropriate working distance according to the size of the work WK and controls the focusing of the image-forming lens 1 according to the specified working distance.

The embodiments of the present disclosure provide the image-forming lens and the inspection apparatus that includes the image-forming lens as described above.

Although the configuration of the present disclosure have been, the present disclosure is not limited to the embodiments described above, and a variety of modifications can naturally be made within the scope of the present disclosure.

For example, the image-forming lens according to the embodiments of the present disclosure is used as an input device for machine vision, in addition to as the imaging device such as a camera.

The advantageous effects described in the embodiments of the present disclosure are preferred effects provided by disclosure, and the preferred effects are just recited; therefore, advantageous effects of the present disclosure are not limited to the effects described in the embodiments.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:
1. An image-forming lens comprising:
a stop;
a first lens group disposed on an object side of the stop; and
a second lens group disposed on an image side of the stop, the first lens group including:
a first lens having positive refractive power;
a second lens having positive refractive power;
a third lens having negative refractive power;
a fourth lens having negative refractive power; and
a fifth lens having positive refractive power, which are sequentially arranged in that order from the object side,
the second lens group including:
a negative subgroup having negative refractive power; and
a positive subgroup having positive refractive power, which are sequentially arranged in that order from the object side,
the first lens group being movable to the object side to increase a distance between the stop and the first lens group in a change in focusing from an object at infinity to an object close to the image-forming lens,
conditional expression (1) below being satisfied:

$$0.45 < f_{1G}/f < 0.75$$

where
$f_{1G}$ is a focal length of the first lens group, and f is a focal length of an entire system of the image-forming lens focused on the object at infinity.

2. The image-forming lens according to claim 1, wherein conditional expression (2) below is satisfied:

$$0.30 < d_{L3\text{-}L4}/D_{1G} < 0.55 \tag{2}$$

where $d_{L3\text{-}L4}$ is a distance along an optical axis between an image-side surface of the third lens and an object-side surface of the fourth lens, and $D_{1G}$ is a distance along the optical axis between an object-side surface of the first lens group and an image-side surface of the fifth lens.

3. The image-forming lens according to claim 1, wherein at least one of the first lens group satisfies conditional expressions (3), (4), and (5) below:

$$1.40 < n_d < 1.63; \tag{3}$$

$$60.0 < v_d < 95.0; \text{ and} \tag{4}$$

$$0.005 < \theta_{g,F} - (-0.001742 * v_d + 0.6490) < 0.060 \tag{5}$$

where $n_d$ is a refractive index of a d line, $v_d$ is an Abbe number of the d line, $\theta_{g,F}$ is a partial dispersion ratio obtained by dividing a difference between a refractive index $n_g$ with respect to the g line and a refractive index $n_F$ with respect to an F line by a difference between the refractive index $n_F$ and a refractive index $n_C$ with respect to a C line.

4. The image-forming lens according to claim 1, wherein the second lens and the third lens are cemented to each other.

5. The image-forming lens according to claim 1, wherein in focusing, the stop and the second lens group are stationary with respect to an image plane of an image sensor.

6. The image-forming lens according to claim 1, wherein conditional expression (6) below is satisfied:

$$0.65 < f_{L3}/f_{L4} < 1.30 \tag{6}$$

where $f_{L3}$ is a focal length of the third lens, and $f_{L4}$ is a focal length of the fourth lens.

7. The image-forming lens according to claim 1, wherein conditional expression (7) below is satisfied:

$$0.05 < (R_{L5S1} - R_{L4S2})/(R_{L5S1} + R_{L4S2}) < 0.30. \tag{7}$$

where $R_{L4S2}$ is a radius of curvature of an image-side surface of the fourth lens, and $R_{L5S1}$ is a radius of curvature of an object-side surface of the fifth lens.

8. The image-forming lens according to claim 1, wherein the second lens group includes a sixth lens having negative refractive power, a seventh lens having negative refractive power, and an eighth lens having positive refractive power, sequentially arranged in that order from the object side to the image side.

9. The image-forming lens according to claim 8, wherein conditional expression (8) below is satisfied:

$$0.50 < (R_{L7S1} + R_{L6S2})/(R_{L7S1} - R_{L6S2}) < 0.95. \tag{8}$$

where $R_{L6S2}$ is a radius of curvature of an image-side surface of the sixth lens, and $R_{L7S1}$ is a radius of curvature of an object-side surface of the seventh lens.

10. The image-forming lens according to claim 8, wherein conditional expression (9) below is satisfied:

$$0.15 < d_{L7\text{-}L8}/L_{2G} < 0.35 \tag{9}$$

where $d_{L7\text{-}L8}$ is a distance from an image-side surface of the seventh lens to an object-side surface of the eighth lens along the optical axis, and $L_{2G}$ is a distance from an object-side surface of the sixth lens to the image plane along the optical axis.

11. The image-forming lens according to claim 1, wherein lenses that constitute the first lens group and the second lens group are all spherical lenses.

12. The image-forming lens according to claim 1, wherein lenses that constitute the first lens group and the second lens group are all made of inorganic solid material.

13. An imaging device comprising the image-forming lens according to claim 1.

* * * * *